US012583235B2

(12) United States Patent
Sakagami

(10) Patent No.: US 12,583,235 B2
(45) Date of Patent: Mar. 24, 2026

(54) PRINTING SYSTEM

(71) Applicant: SEIKO EPSON CORPORATION, Tokyo (JP)

(72) Inventor: Shota Sakagami, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 18/425,155

(22) Filed: Jan. 29, 2024

(65) Prior Publication Data

US 2024/0253366 A1 Aug. 1, 2024

(30) Foreign Application Priority Data

Jan. 30, 2023 (JP) ................................ 2023-011630

(51) Int. Cl.
*B41J 3/60* (2006.01)
*B41J 29/13* (2006.01)
*B41J 29/38* (2006.01)

(52) U.S. Cl.
CPC ................ *B41J 3/60* (2013.01); *B41J 29/13* (2013.01); *B41J 29/38* (2013.01)

(58) Field of Classification Search
CPC ............... B41J 13/009; G03G 15/6529; G03G 2215/00358; G03G 2215/00924
USPC ....................................... 271/9.02, 301, 302
See application file for complete search history.

(56) References Cited

U.S. PATENT DOCUMENTS 4,745,490 A * 5/1988 Shimizu ................ H04N 1/203 355/24
4,972,236 A * 11/1990 Hasegawa .......... G03G 15/0194 399/361
6,925,283 B1 * 8/2005 Mandel .................. G03G 15/65 399/388
7,024,152 B2 * 4/2006 Lofthus ............. G03G 15/6529 399/397
7,188,929 B2 * 3/2007 Lofthus .................... B65H 5/26 347/101
8,320,816 B2 * 11/2012 Bober ................. G03G 15/234 271/291

FOREIGN PATENT DOCUMENTS

JP 2019-147675 A 9/2019

* cited by examiner

*Primary Examiner* — Leslie A Nicholson, III
(74) *Attorney, Agent, or Firm* — WORKMAN NYDEGGER

(57) ABSTRACT

A printing system includes a first printing machine having a first printing section configured to print on a medium and a first in-machine inversion section configured to inverse the medium; a first inversion device having a first in-device inversion section configured to inverse the medium from the first printing machine and a bypass transport section configured to transport the medium from the first printing machine toward a second printing machine without via the first in-device inversion section; the second printing machine having a second printing section configured to print on the medium from the first inversion device; and a control section, wherein when printing is performed on the medium in a state where an abnormality has occurred in the first in-device inversion section, the control section transports the medium inversed by the first in-machine inversion section toward the second printing machine via the bypass transport section.

7 Claims, 7 Drawing Sheets

PRINTING SYSTEM

The present application is based on, and claims priority from JP Application Serial Number 2023-011630, filed Jan. 30, 2023, the disclosure of which is hereby incorporated by reference herein in its entirety.

BACKGROUND

1. Technical Field

The present disclosure relates to a printing system.

2. Related Art

JP-A-2019-147675 discloses a double-sided printing system provided with an upstream side printing device that executes a printing process on one surface of a paper sheet, and a downstream side printing device that executes a printing process on the other surface of the paper sheet on which the printing process has been executed by the upstream side printing device. Paper sheet are an example of a medium. A double-sided printing system is an example of a printing system. It is disclosed that the double-sided printing system is provided with an intermediate device at a position between the upstream side printing device and the downstream side printing device in the transport direction of the paper sheet. The intermediate device is an example of a inversion device. The intermediate device inverses the front and the rear of the paper sheet transported out from the upstream side printing device. The intermediate device further includes a transport path for transporting the paper sheet, whose front and rear were inversed, to the downstream side printing device and a transport section for transporting the paper sheet along the transport path.

However, in the double-sided printing system of JP-A-2019-147675, if an abnormality occurs in the intermediate device, tandem printing cannot be performed by the upstream side printing device and the downstream side printing device. If the tandem printing cannot be performed until an abnormality of the intermediate device is canceled, downtime may occur.

SUMMARY

A printing system includes a first printing machine including a first printing section configured to print on a medium transported in a transport direction and a first in-machine inversion section configured to inverse the medium printed by the first printing section; a first inversion device that is provided downstream of the first printing machine in the transport direction and that is configured to inverse the medium; a second printing machine that is provided downstream of the first inversion device in the transport direction and that has a second printing section configured to print on the medium; and a control section, wherein the first inversion device includes a first in-device inversion section configured to inverse the medium and a bypass transport section configured to transport the medium from the first printing machine toward the second printing machine without via the first in-device inversion section and when printing is performed on both surfaces of the medium in a state where an abnormality has occurred in the first in-device inversion section, the control section causes the first printing section to perform printing on a first surface of the medium, causes the first in-machine inversion section to inverse the printed medium, causes the inversed medium to be transported toward the second printing machine via the bypass transport section, and causes the second printing section to perform printing on a second surface of the medium.

DESCRIPTION OF EMBODIMENTS

Figure 1:
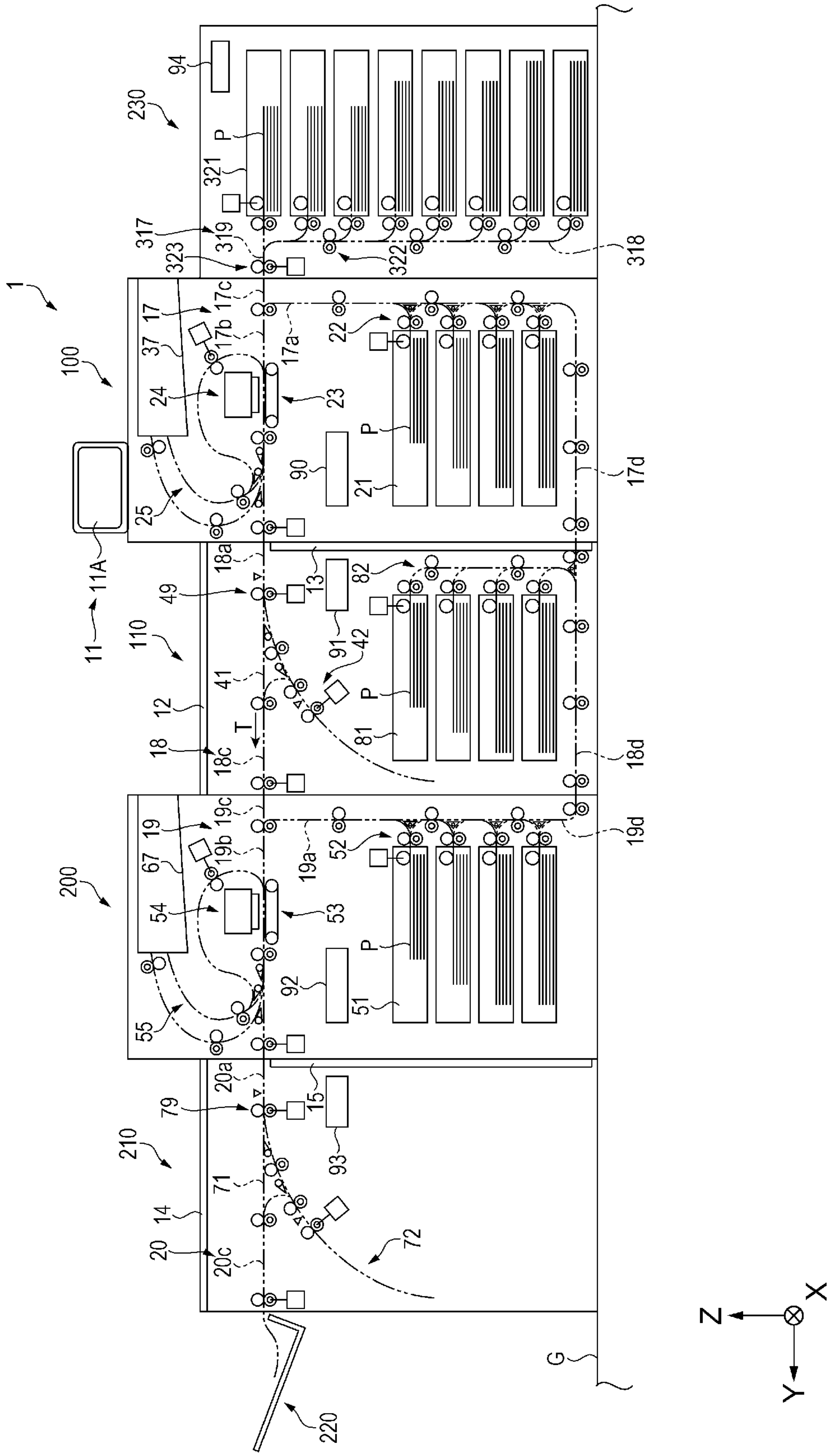
FIG. 1 is a schematic diagram showing a printing system.

Hereinafter, the present disclosure will be described based on embodiments. In each drawing, the same members are denoted by the same reference symbols, and a repetitive description will be omitted. Note that, in the present specification, "same", "identical", and "simultaneous" do not only refer to being exactly the same. For example, in the present specification, "same", "identical", and "simultaneous" include the case of being the same in consideration of a measurement error.

For example, in the present specification, "same", "identical", and "simultaneous" include a case of being the same in consideration of manufacturing variation of members. For example, in the present specification, "same", "identical", and "simultaneous" include the case of being the same as long as a function is not impaired. Therefore, for example, "both dimensions are the same" means that a dimensional difference between both dimensions is within ±5%, particularly preferably within ±3% of one dimension in consideration of manufacturing variations of members and a measurement error.

1. First Embodiment

In the present embodiment, a printing system 1 is an inkjet printer that performs printing by ejecting ink, which is an example of a liquid, onto a medium P, which is an example of a sheet of paper such as printing paper. The printing system 1 includes a medium accommodation device 230, a first printing machine 100, a first inversion device 110, a second printing machine 200, and a second inversion device 210. The first printing machine 100 and the second printing machine 200 perform printing by ejecting ink onto the medium P. The first inversion device 110 and the second inversion device 210 perform an inversion process of inversing the front and the rear of the medium P being transported.

Note that in each figure, X, Y, and Z represent three spatial axes orthogonal to each other. In this specification, directions extending along these axes are referred to as an X-axis direction, a Y-axis direction, and a Z-axis direction. When the direction is specified, positive and negative signs are used together with direction notation, that is, a positive direction is set as "+" and a negative direction is set as "−", and a direction in which an arrow in each drawing is directed is set as a +direction and a direction opposite to the arrow is set as a −direction.

The Z-axis direction indicates the gravity direction, the +Z direction indicates a vertically upward direction, and the −Z direction indicates a vertically downward direction. A plane including the X-axis and the Y-axis is described as an X-Y plane, a plane including the X-axis and the Z-axis is described as an X-Z plane, and a plane including the Y-axis and the Z-axis is described as a Y-Z plane. The X-Y plane is a horizontal plane. Further, the three spatial axes of X, Y, and Z, when not limited to positive or negative directions, are described as the X-axis, the Y-axis, and the Z-axis, respectively.

The X-axis direction is a device depth direction and a medium width direction. Among the X-axis directions, the +X direction is a direction from a device rear surface toward a device front surface, and the −X direction is a direction from the device front surface toward the device rear surface.

The Y-axis direction is the width direction of the printing system 1, the medium accommodation device 230, the first printing machine 100, the first inversion device 110, the second printing machine 200, and the second inversion device 210. As viewed the printing system 1 from the front, the +Y direction is the left side and the −Y direction is the right side. The front surface of the printing system 1 is a surface on the side where an operation section 11 operated by a user to give an instruction to the printing system 1 is positioned.

The Z-axis direction is a normal direction with respect to an installation surface G on which the printing system 1, the medium accommodation device 230, the first printing machine 100, the first inversion device 110, the second printing machine 200, and the second inversion device 210 are installed. Therefore, the Z-axis direction is a height direction of the printing system 1, the medium accommodation device 230, the first printing machine 100, the first inversion device 110, the second printing machine 200, and the second inversion device 210.

Hereinafter, in a transport direction T of the medium P indicated by an arrow in each drawing, a direction in which the medium P is transported may be referred to as “downstream”, and a direction opposite thereto may be referred to as “upstream”. In each of the drawings, a transport path is indicated by two dot chain line. In the printing system 1, the medium P is transported through the transport path indicated by two dot chain line.

As shown in FIG. 1, the printing system 1 includes the medium accommodation device 230 at a position adjacent to the first printing machine 100 on the −Y direction side. The printing system 1 includes the first inversion device 110 at a position adjacent to the first printing machine 100 on the +Y direction side. The printing system 1 is provided with the second printing machine 200 at a position adjacent to the first inversion device 110 on the +Y direction side. In other words, the second printing machine 200 is provided downstream of the first printing machine 100 in the transport direction T. In other words, the first inversion device 110 is provided between the first printing machine 100 and the second printing machine 200 in the transport direction T. The printing system 1 includes the second inversion device 210 at a position adjacent to the second printing machine 200 on the +Y direction side. In other words, the second inversion device 210 is provided downstream of the second printing machine 200 in the transport direction T.

The medium accommodation device 230 has a transport path 317. The first printing machine 100 has a transport path 17. The first inversion device 110 has a transport path 18. The second printing machine 200 has a transport path 19. The second inversion device 210 has a transport path 20. Thus, in the printing system 1, the transport paths 317, 17, 18, 19, and 20 form a transport path extending from the medium accommodation device 230, which is the upstream side, to the second inversion device 210, which is the downstream side, via the first printing machine 100, the first inversion device 110, and the second printing machine 200.

Figure 2:
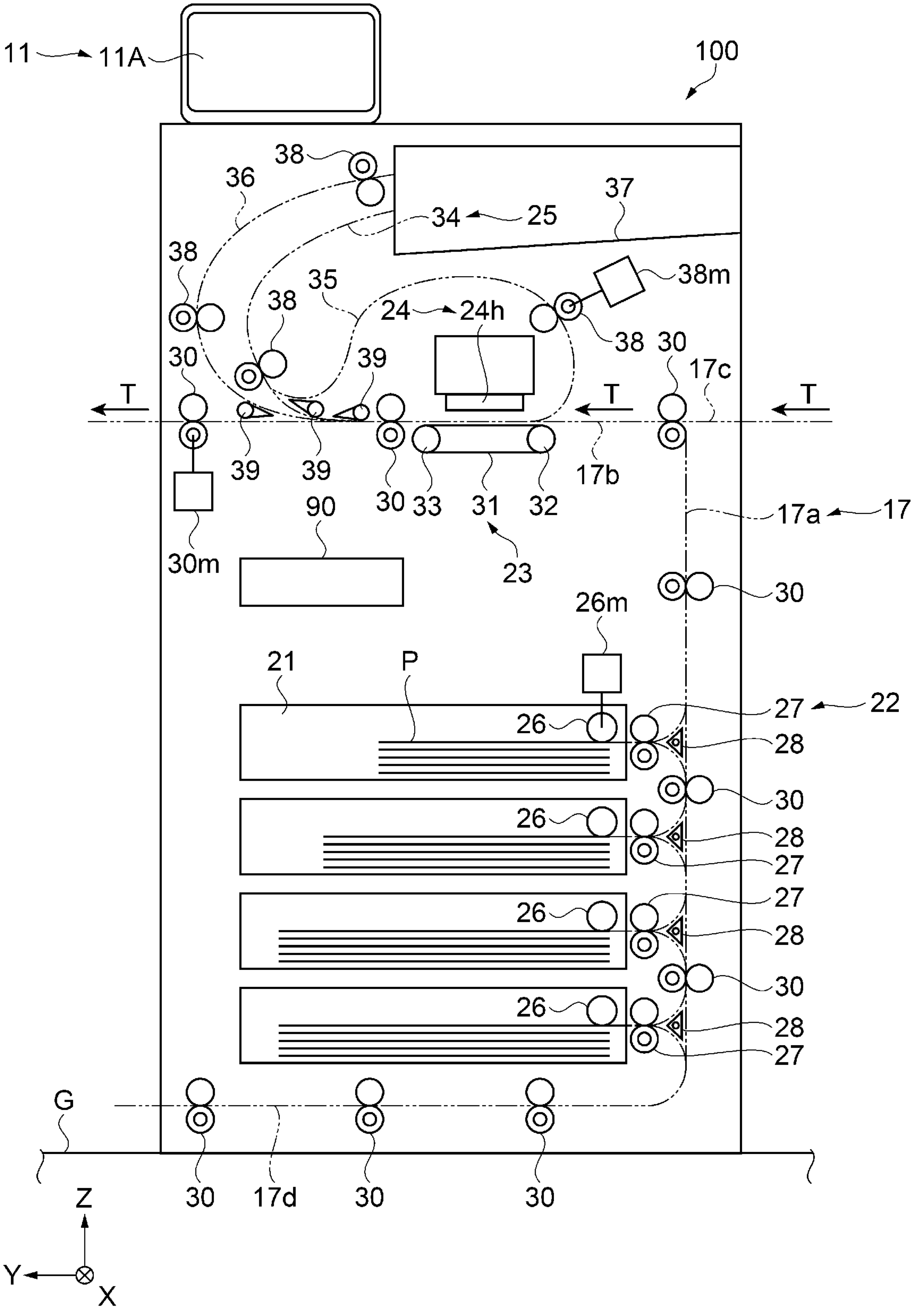
FIG. 2 is a schematic diagram showing a first printing machine in the printing system.

As shown in FIGS. 1 and 2, the first printing machine 100 includes the operation section 11, the transport path 17, a first medium accommodation section 21, a feeding section 22, a transport section 23, a first printing section 24, a first in-machine inversion section 25, a discharge section 37, and a control section 90.

The operation section 11 is provided on the upper side of the side surface on the −X direction side, which is the front side of the housing of the first printing machine 100. The operation section 11 has a display section 11A made of a touch panel. The user can give an instruction to the printing system 1 by performing a touch operation on the display section 11A. For example, when print data is printed on both surfaces of the medium P, the user can select which of the two sets of print data is to be printed first through the operation section 11. For example, the user can select a print mode using the operation section 11 when printing is performed on both surfaces of the medium P. Note that the operation section 11 may be configured to have an operation button.

The transport path 17 is composed of supply paths 17*a* and 17*d*, a first transport path 17*b*, and a first connection path 17*c*. The supply path 17*a* is a transport path that connects the first medium accommodation section 21 and the first transport path 17*b*. A downstream end of the first transport path 17*b* continuing from the supply path 17*a* is connected to a pre-inversion path 18*a*, which constitutes the transport path 18 of the first inversion device 110.

The supply path 17*d* is a transport path that connects the end of the supply path 17*a* on the −Z direction side to a medium accommodation section 81 of the first inversion device 110 and a second medium accommodation section 51 of the second printing machine 200. The supply path 17*d* connects the end of the supply path 17*a* on the −Z direction side and the medium accommodation section 81 via a supply path 18*d* of the first inversion device 110.

The supply path 17*d* connects the end of the supply path 17*a* on the −Z direction side and the second medium accommodation section 51 via the supply path 18*d* and supply paths 19*a* and 19*d* of the second printing machine 200. Thus, the supply paths 17*a* and 17*d* connect the first transport path 17*b* and the second medium accommodation section 51. The supply paths 17*a*, 17*d*, 18*d*, 19*d*, and 19*a* connect the upstream end of the first transport path 17*b* and the upstream end of a second transport path 19*b* in the second printing machine 200.

The first connection path 17*c* connects the upstream end of the first transport path 17*b* and a feed out path 319 of the medium accommodation device 230. The first connection path 17*c* is a transport path that introduces the medium P fed from the medium accommodation device 230 to the first transport path 17*b*.

As shown in FIG. 2, the transport path 17 is provided with an inversion path 34, a merging path 35, and a discharge path 36. The discharge path 36 is a transport path connecting a position between an ejection section 24*h* and the downstream end of the first transport path 17*b* in the first transport path 17*b* and the discharge section 37. One end of the inversion path 34 is connected to a position between the connection position of the discharge path 36 and the first transport path 17*b* and a transport belt 31 in the first transport path 17*b*. The merging path 35 is a transport path that connects a position upstream of the ejection section 24*h* in the first transport path 17*b* and the inversion path 34.

The discharge path 36 is used when the medium P on which printing is performed by the first printing section 24 is discharged to the discharge section 37. The inversion path 34 is used when the inversion process of inversing the front and the rear of the medium P is performed in the first printing machine 100. In the inversion process, an operation of returning the medium P introduced into the inversion path 34 from the inversion path 34 to the first transport path 17*b* via the merging path 35 is performed. The merging path 35 is used to return the medium P introduced into the inversion path 34 to the first transport path 17*b*.

As shown in FIGS. 1 and 2, the first medium accommodation section 21 is a cassette-type accommodation section that can accommodate the medium P in a stacked state. In the first printing machine 100, at least one (four in FIG. 2) first medium accommodation section 21 is provided to be detachable from and attachable to from the −X direction side of the first printing machine 100.

The feeding section 22 feeds the medium P accommodated in the first medium accommodation section 21 to the first transport path 17*b* via the supply path 17*a*. The feeding section 22 feeds the medium P that is transported from the second medium accommodation section 51 of the second printing machine 200 and from the medium accommodation section 81 of the first inversion device 110 to the first transporting path 17*b* via the supplying paths 17*d* and 17*a*. The feeding section 22 transports the medium P accommodated in the first medium accommodation section 21 toward the second transport path 19*b* of the second printing machine 200 via the supply paths 17*a* and 17*d*.

Figure 7:
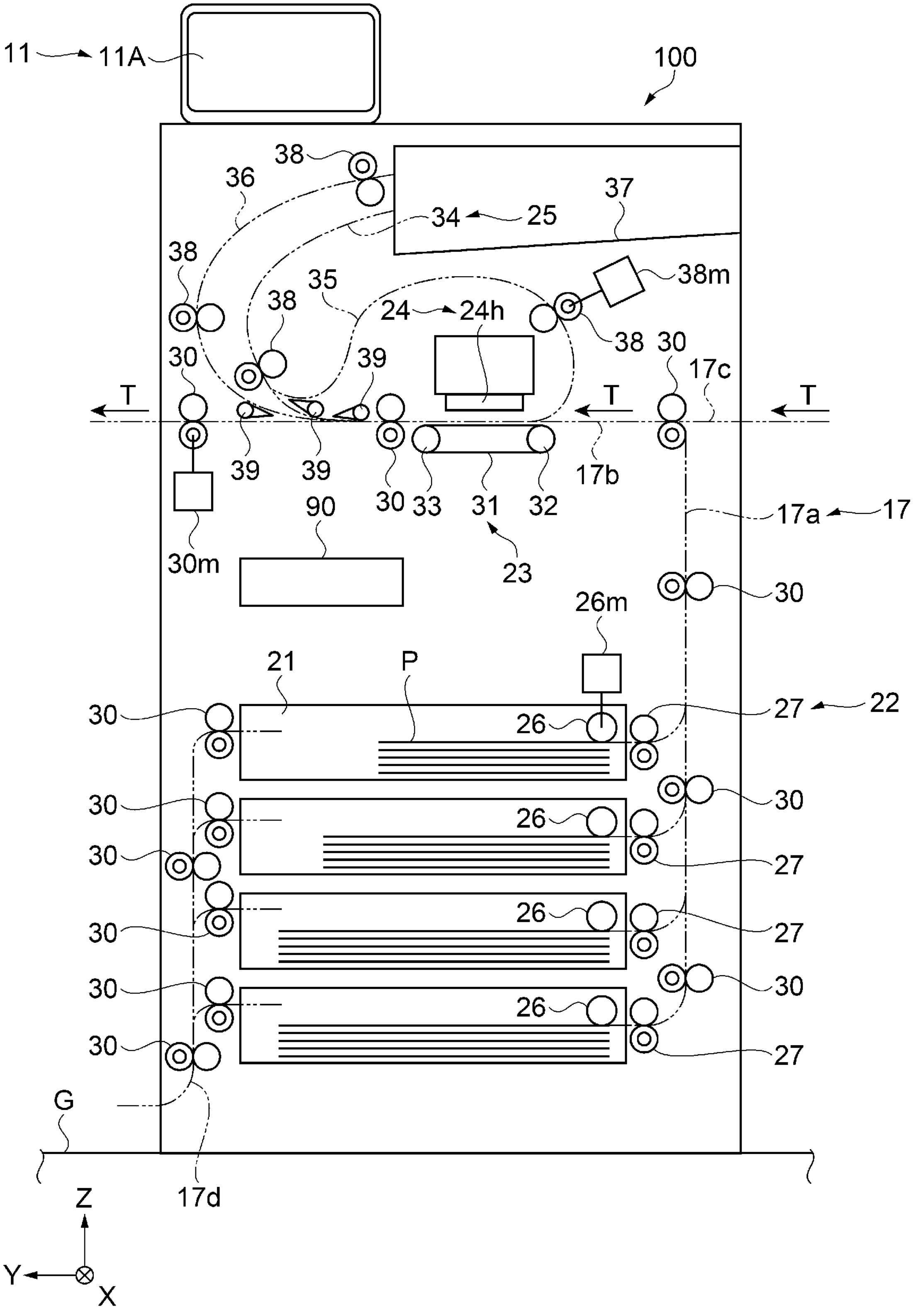
FIG. 7 is a schematic diagram showing another embodiment of the first printing machine.

Note that the feeding section 22 may transport the medium P transported from the second medium accommodation section 51 of the second printing machine 200 or from the medium accommodation section 81 of the first inversion device 110 to the first medium accommodation section 21. As a result, the medium P transported from the second medium accommodation section 51 of the second printing machine 200 and from the medium accommodation section 81 of the first inversion device 110 are fed to the first transport path 17*b* via the first medium accommodation section 21. In this case, as shown in FIGS. 1 and 7, the supply path 17*d* connects the first medium accommodation section 21 and the supply path 18*d* of the first inversion device 110. As a result, the supply paths 17*a* and 17*d* connect the first transport path 17*b* and the second medium accommodation section 51 of the second printing machine 200. In this case, the feeding section 22 may not include guide flaps 28 (to be described later).

As shown in FIGS. 1 and 2, the feeding section 22 includes pickup rollers 26, separation roller pairs 27, the guide flaps 28, and transport roller pairs 30. The pickup roller 26 rotates along with the driving of a feed motor 26*m*. Accordingly, the pickup roller 26 feeds out the uppermost medium P among the medium P disposed in a stacked state in the first medium accommodation section 21 to the downstream side. The separation roller pair 27 separates the medium P fed out by the pickup roller 26 one sheet at a time.

The guide flap 28 is provided at a position downstream of the separation roller pair 27 in the supply path 17*a*. The guide flap 28 is pivoted by a solenoid (not shown) and guides the transport direction of the medium P in a direction toward the first transport path 17*b* or a direction toward the supply path 17*d*. The transport roller pair 30 is provided in the supply paths 17*a* and 17*d*. The transport roller pair 30 rotates along with the driving of a transport motor 30*m*. As a result, the transport roller pair 30 transports the medium P in a direction toward the first transport path 17*b* or a direction toward the supply path 17*d*.

The transport section 23 transports the medium P fed by the feeding section 22 toward the first printing section 24 via the first transport path 17*b* and sends out the medium P on which printing has been completed to the first inversion device 110. The transport section 23 includes the transport roller pair 30. The transport roller pair 30 rotates along with the driving of the transport motor 30*m*. Thus, the transport roller pair 30 transports the medium P along the transport path 17. Furthermore, the transport section 23 includes a drive pulley 32 and a driven pulley 33 around which an endless transport belt 31 is wound at a position along the first transport path 17*b*. The medium P is transported along with the rotation of the transport belt 31 in a state of electrostatic attraction on a support surface, which is the outer circumferential surface of the transport belt 31.

The first printing section 24 includes the ejection section 24*h* that performs printing by ejecting ink supplied from an ink tank (not shown) onto the medium P. The ejection section 24*h* is positioned on the +Z direction side of the transport belt 31 and is provided at a position facing the transport belt 31 with the first transport path 17*b* interposed therebetween in the Z-axis direction. The first printing section 24 deposits ink on the medium P by ejecting ink from the ejection section 24*h* onto the medium P supported and transported by the transport belt 31 based on the print data. Thus, an image based on the print data is formed on the medium P.

The ejection section 24*h* included in the first printing section 24 of the present embodiment is a so-called line head capable of simultaneously ejecting ink across the width direction of the medium P, which is the X-axis direction. The print data is data for causing the first printing section 24 to execute printing, which is generated based on image data to be printed on the medium P. The image data includes text data and data of images. Note that in the following description, the front surface of the medium P transported in the printing system 1, on which the print data is printed first is referred to as a first surface, and the rear surface of the first surface is referred to as a second surface.

The first in-machine inversion section 25 is provided in the first printing machine 100 so as to be able to inverse the front and the rear of the medium P. The first in-machine inversion section 25 is composed of the inversion path 34, the merging path 35, and transport roller pairs 38, guide flaps 39, and a transport motor 38*m* included in these paths. Drive of the first in-machine inversion section 25 is controlled by the control section 90 when the inversion process of the medium P is performed in the first printing machine 100.

The transport roller pairs 38 are provided at various positions in the inversion path 34, the merging path 35, and the discharge path 36, and are driven by the transport motor 38*m*. The guide flaps 39 are provided at a branch point between the first transport path 17*b* and the inversion path 34, a branch point between the first transport path 17*b* and the discharge path 36, and a connection point between the inversion path 34 and the merging path 35. The guide flaps 39 are pivoted by solenoids (not shown) and guide the transport direction of the medium P transported to each branch point or connection point in the transport path.

The control section 90 includes a central processing unit (CPU, not shown), a storage section, and the like. The CPU can execute various programs stored in the storage section and can perform various judgments, various instructions, and the like. The storage section stores, for example, various programs for performing drive control of the feeding section 22, drive control of the transport section 23, ejection control of the ejection section 24*h* in the first printing section 24, and the like when printing is performed on the medium P. The storage section also stores set values such as a set value S1 (to be described later), various tables, and the like.

For example, the control section 90 performs printing on the medium P by performing drive control of the feeding section 22, the transport section 23, the first printing section 24, and the like. For example, the control section 90 sends out the medium P to the discharge section 37 by controlling drive of the transport roller pairs 38 provided in the discharge path 36 and the guide flaps 39 provided in the first transport path 17*b*. For example, the control section 90 performs the inversion process of the medium P in the first printing machine 100 by controlling drive of the transport roller pairs 38 and the guide flaps 39, which constitute the first in-machine inversion section 25.

The control section 90 has a communication function with control sections 91, 92, 93, and 94 (to be described later). The control section 90 performs control of the first printing machine 100, the first inversion device 110, the second printing machine 200, the second inversion device 210, and the medium accommodation device 230 in cooperation with the control sections 91, 92, 93, and 94. Thus, for example, the control section 90 transports through the transport paths 317, 17, 18, 19, and 20, and sends out the medium P, which has been printed on the front and the rear sides by the first printing machine 100 and the second printing machine 200, to a placement section 220.

Figure 3:
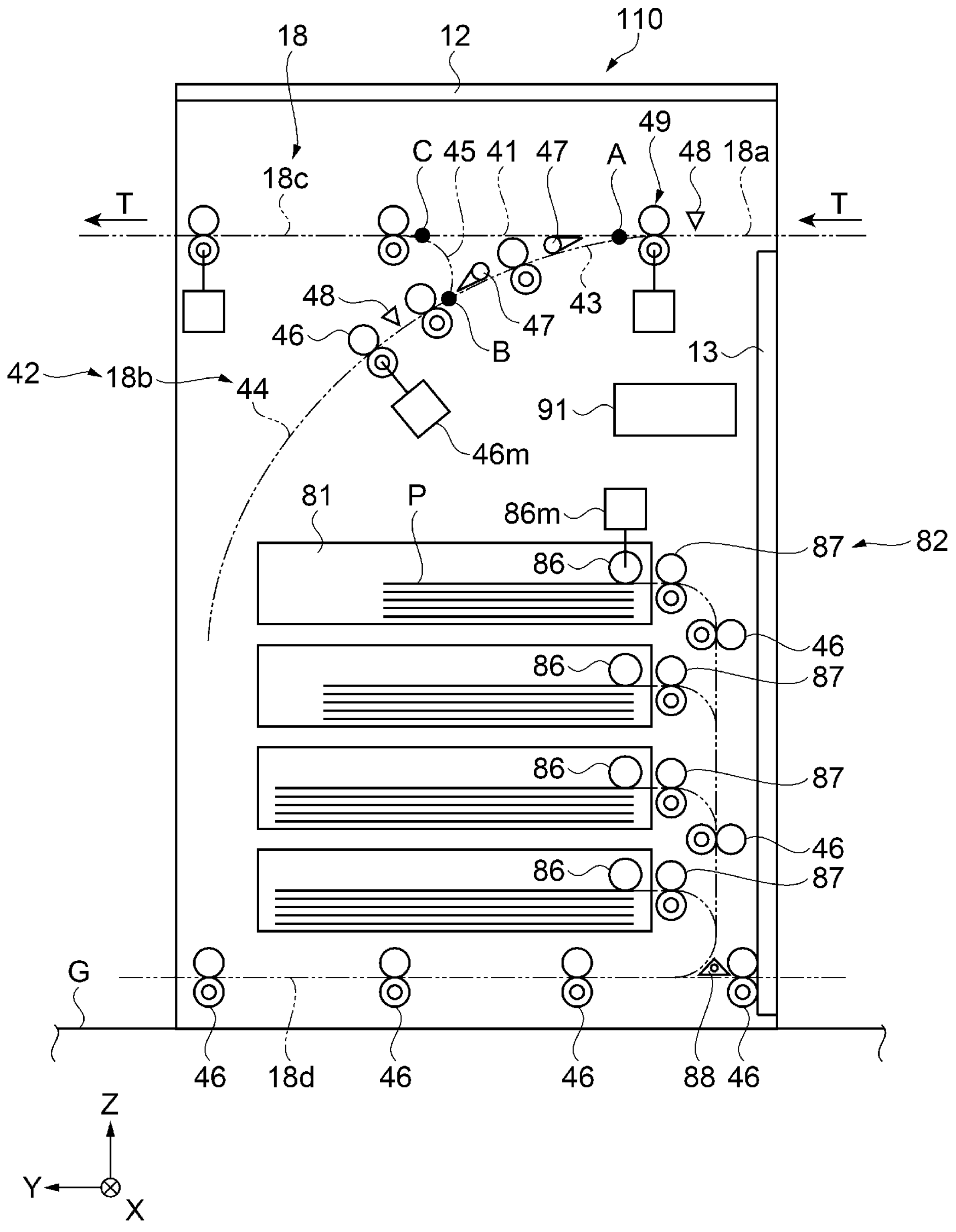
FIG. 3 is a schematic diagram showing a first inversion device in the printing system.

As shown in FIGS. 1 and 3, the first inversion device 110 includes the transport path 18, a first in-device inversion section 42, a transport section 49, a second cover 12, a first cover 13, the medium accommodation section 81, a feeding section 82, and the control section 91. The first inversion device 110 configures the transport path 18 in which the first surface and the second surface of the medium P are inversed and transported.

As shown in FIG. 3, the transport path 18 is composed of the pre-inversion path 18*a*, an inversion path 18*b*, a post-inversion path 18*c*, a bypass transport section 41, and the supply path 18*d*. The upstream end of the pre-inversion path 18*a* is connected to the transport path 17 of the first printing machine 100, and the medium P is introduced therein. A downstream end of the pre-inversion path 18*a* is connected to an upstream end of the inversion path 18*b* and to an upstream end of the bypass transport section 41 at a branch point A.

The inversion path 18*b* includes a branch path 43, an inversion path end section 44, and a merging path 45. The branch path 43 is a transport path from the branch point A to a connection point B. The merging path 45 is a transport path from the connection point B to a merge point C.

An upstream end of the post-inversion path 18*c* is connected to a downstream end of the merging path 45 and a downstream end of the bypass transport section 41 at the merge point C. The medium P that was inversed in the inversion path 18*b* or the medium P that was transported from the bypass transport section 41 is transported to the post-inversion path 18*c*. The downstream end of the post-inversion path 18*c* is connected to a second connection path 19*c* constituting the transport path 19 of the second printing machine 200. In other words, the bypass transport section 41 includes a bypass transport path capable of transporting the medium P transported from the first printing machine 100 toward the second printing machine 200 without passing through the first in-device inversion section 42, which includes inversion path 18*b*. Transport of the medium P in the first in-device inversion section 42 and in the bypass transport section 41 is individually controllable, and even when an abnormality occurs in the first in-device inversion section 42, transport control of the bypass transport section 41 can be performed. Examples of an abnormality include a jam. A jam can be determined by whether or not the medium P has correctly passed through a sensor (not shown). When the sensor cannot detect the passage of the medium P, it can be determined that a jam has occurred.

The supply path 18*d* is a transport path that extends in the −Y direction from the medium accommodation section 81, branches after extending in the −Z direction, and extends in the −Y direction and the +Y direction from the branch position. An end of the supply path 18*d* extending in the −Y direction from the branch position is connected to an end on the +Y direction side of the supply path 17*d* of the first printing machine 100. An end of the supply path 18*d* extending in the +Y direction from the branch position is connected to an end on the −Y direction side of the supply path 19*d* of the second printing machine 200.

The transport section 49 is composed of transport roller pairs 46, a sensor 48, and a guide flap 47 provided at the branch point A. The transport section 49 is controlled to be driven by the control section 91, transports the medium P along the transport path 18, and sends out the medium P to the second printing machine 200.

The transport roller pairs 46 are provided at various positions in the transport path 18 and are driven by a transport motor 46*m*. The sensor 48 is provided in the pre-inversion path 18*a* and detects the medium P to be transported to the pre-inversion path 18*a*. The guide flap 47 is provided at the branch point A and guides the transport direction of the medium P to be transported. The guide flap 47 is pivoted by a solenoid (not shown) and guides the transport direction of the medium P at the branch point of the transport path.

The first in-device inversion section 42 is provided in the first inversion device 110 so as to be able to inverse the front and the rear of the medium P. The first in-device inversion section 42 is composed of the branch path 43, the inversion path end section 44, the merging path 45, the transport roller pairs 46 included in these paths, a guide flap 47 provided at a branch point B, and a sensor 48. The sensor 48 is provided in the inversion path end section 44, and detects the medium P transported to the inversion path end section 44 or the medium P sent out from the inversion path end section 44 to the merging path 45.

The second cover 12 is provided on the housing of the first inversion device 110 and is pivotable around an axis along the Y-axis. By pivoting, the second cover 12 can be displaced between an open position shown in FIG. 3 and a closed position (not shown). The open position of the second cover 12 is a position at which the pre-inversion path 18*a*, the bypass transport section 41, and the post-inversion path 18*c* are accessible. The closed position of the second cover 12 is a position at which the −X direction side of the pre-inversion path 18*a*, the bypass transport section 41, and the post-inversion path 18*c* are covered.

The first cover 13 is provided on the housing of the first inversion device 110 and is pivotable around an axis along the Z-axis. By pivoting, the first cover 13 can be displaced between an open position shown in FIG. 3 and a closed position (not shown). The open position of the first cover 13 is a position at which the first in-device inversion section 42 and the medium accommodation section 81 are accessible.

The closed position of the first cover 13 is a position at which the −X direction side of the first in-device inversion section 42 and the medium accommodation section 81 are covered.

The medium accommodation section 81 is a cassette-type accommodating section capable of accommodating the medium P in a stacked state. In the first inversion device 110, at least one (four in FIG. 3) medium accommodation section 81 is provided to be detachable from and attachable to the first inversion device 110 from the −X direction side of the first inversion device 110.

The feeding section 82 includes pickup rollers 86, separation roller pairs 87, guide flaps 88, and transport roller pairs 46. The pickup roller 86 rotates along with the driving of a feed motor 86*m*. Accordingly, the pickup roller 86 feeds out the uppermost medium P among the medium P disposed in a stacked state in the medium accommodation section 81 to the downstream side. The separation roller pair 87 separates the medium P fed out by the pickup roller 86 one sheet at a time.

The guide flap 88 is provided at a branch position of the supply path 18*d*. The guide flap 88 is pivoted by a solenoid (not shown). By pivoting, the guide flap 88 guides the transport direction of the medium P in a direction from the branching position toward the supply path 17*d* of the first printing machine 100 or a direction from the branching position toward the supply path 19*d* of the second printing machine 200. The transport roller pair 46 is provided in the supply path 18*d*. The transport roller pair 46 rotates along with the driving of the transport motor 46*m*. As a result, the transport roller pair 46 transports the medium P in a direction toward the supply path 17*d* or in a direction toward the supply path 19*d*.

The control section 91 includes a central processing unit (CPU, not shown), a storage section, and the like. The CPU can execute various programs stored in the storage section and can perform various judgments, various instructions, and the like. The storage section stores, for example, various programs for performing drive control and the like of the first in-device inversion section 42 when the inversion process of the medium P is performed, various tables, and the like.

The control section 91 has a communication function with the control sections 90, 92, 93, and 94. The control section 91 controls drive of the transport roller pairs 46, the sensor 48, and the guide flaps 47 in cooperation with the control sections 90, 92, 93, and 94, and performs the transport and the inversion process of the medium P.

In the inversion process, the medium P introduced into the pre-inversion path 18*a* is transported from the branch path 43 to the post-inversion path 18*c* via the inversion path end section 44 and the merging path 45. Note that when the inversion process of the medium P is not performed, the control section 91 transports the medium P introduced to the pre-inversion path 18*a* to the post-inversion path 18*c* via the bypass transport section 41 provided between the branch point A and the merge point C.

The control section 91 controls drive of the feeding section 82 in cooperation with the control sections 90, 92, 93, and 94, thereby transporting the medium P of the medium accommodation section 81 in the direction toward the supply path 17*d* of the first printing machine 100 or in the direction from the branch position toward the supply path 19*d* of the second printing machine 200.

Figure 4:
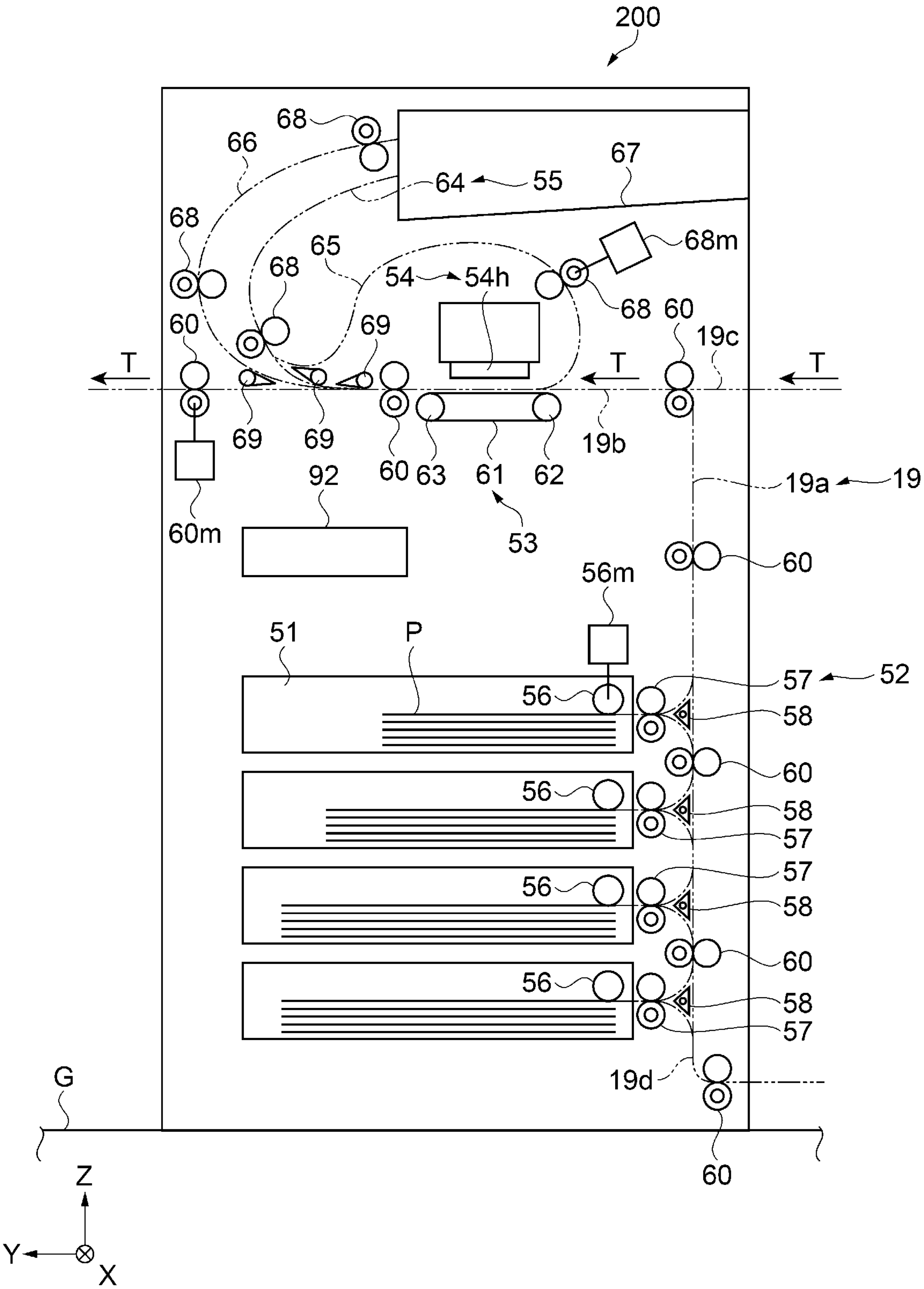
FIG. 4 is a schematic diagram showing a second printing machine in the printing system.

As shown in FIGS. 1 and 4, the second printing machine 200 includes the transport path 19, the second medium accommodation section 51, a feeding section 52, a transport section 53, a second printing section 54, a second in-machine inversion section 55, a discharge section 67, and the control section 92.

The transport path 19 is composed of the supply paths 19*a* and 19*d*, the second transport path 19*b*, and the second connection path 19*c*. The supply path 19*a* is a transport path that connects the second medium accommodation section 51 and the second transport path 19*b*. A downstream end of the second transport path 19*b* continuing from the supply path 19*a* is connected to a pre-inversion path 20*a* constituting the transport path 20 of the second inversion device 210.

The supply path 19*d* is a transport path that connects the end of the supply path 19*a* on the −Z direction side to the medium accommodation section 81 of the first inversion device 110 and the first medium accommodation section 21 of the first printing machine 100. Thus, the supply paths 19*a* and 19*d* connect the first transport path 17*b* of the first printing machine 100 and the second medium accommodation section 51. The supply path 19*d* connects the end of the supply path 19*a* on the −Z direction side and the medium accommodation section 81 via the supply path 18*d* of the first inversion device 110.

The supply path 19*d* connects the end of the supply path 19*a* on the −Z direction side and the first medium accommodation section 21 via the supply path 18*d* and the supply paths 17*d* and 17*a* of the first printing machine 100.

The second connection path 19*c* connects the upstream end of the second transport path 19*b* and the post-inversion path 18*c* of the first inversion device 110. The second connection path 19*c* is a transport path through which the medium P transported through the first transport path 17*b* of the first printing machine 100 via the first inversion device 110 is introduced into the second transport path 19*b*.

As shown in FIG. 4, the transport path 19 is provided with an inversion path 64, a merging path 65, and a discharge path 66. The discharge path 66 is a transport path connecting a position between an ejection section 54*h* and the downstream end of the second transport path 19*b* in the second transport path 19*b* and the discharge section 67. One end of the inversion path 64 is connected to a position between the connection position of the discharge path 66 and the second transport path 19*b* and a transport belt 61 in the second transport path 19*b*. The merging path 65 is a transport path that connects a position upstream of the ejection section 54*h* in the second transport path 19*b* and the inversion path 64.

The discharge path 66 is used when the medium P on which printing was performed by the second printing section 54 is discharged to the discharge section 67. The inversion path 64 is used when the inversion process of inversing the front and the rear of the medium P is performed in the second printing machine 200. In the inversion process, an operation of returning the medium P introduced into the inversion path 64 from the inversion path 64 to the second transport path 19*b* via the merging path 65 is performed. The merging path 65 is used to return the medium P introduced into the inversion path 64 to the second transport path 19*b*.

As shown in FIGS. 1 and 4, the second medium accommodation section 51 is a cassette-type accommodation section that can accommodate the medium P in a stacked state. In the second printing machine 200, at least one (four in FIG. 4) second medium accommodation section 51 is provided to be detachable from and attachable to the second printing machine 200 from the −X direction side of the second printing machine 200.

The feeding section 52 feeds the medium P accommodated in the second medium accommodation section 51 to the second transport path 19*b* via the supply path 19*a*. The feeding section 52 feeds the medium P which is transported from the first medium accommodation section 21 of the first printing machine 100 and the from medium accommodation section 81 of the first inversion device 110 to the second transporting path 19*b* via the supplying paths 19*d* and 19*a*. The feeding section 52 transports the medium P accommodated in the second medium accommodation section 51 toward either the first transport path 17*b* or the supply path 17*d* of the first printing machine 100 via the supply paths 19*a* and 19*d*.

As illustrated in FIG. 4, the feeding section 52 includes pickup rollers 56, separation roller pairs 57, guide flaps 58, and transport roller pairs 60. The pickup roller 56 rotates along with the driving of a feed motor 56*m*. Accordingly, the pickup roller 56 feeds out the uppermost medium P among the medium P disposed in a stacked state in the second medium accommodation section 51 to the downstream side. The separation roller pair 57 separates the medium P fed out by the pickup roller 56 one sheet at a time.

The guide flap 58 is provided at a position downstream of the separation roller pair 57 in the supply path 19*a*. The guide flap 58 is pivoted by a solenoid (not shown) and guides the transport direction of the medium P in a direction toward the second transport path 19*b* or a direction toward the supply path 19*d*. The transport roller pairs 60 are provided in the supply paths 19*a* and 19*d*. The transport roller pairs 60 rotate along with the driving of a transport motor 60*m*. As a result, the transport roller pairs 60 transport the medium P in a direction toward the second transport path 19*b* or a direction toward the supply path 19*d*.

The transport section 53 transports the medium P transported from the first inversion device 110 to the second connection path 19*c* or the medium P fed by the feeding section 52 toward the second printing section 54 via the second transport path 19*b*. Then, the transport section 53 sends out the medium P on which printing has been completed to the second inversion device 210 via the second transport path 19*b*.

The transport section 53 includes the transport roller pairs 60. The transport roller pairs 60 rotate along with the driving of the transport motor 60*m*. Thus, the transport roller pairs 60 transport the medium P along the transport path 19. Furthermore, the transport section 53 includes a drive pulley 62 and a driven pulley 63 around which an endless transport belt 61 is wound at a position along the second transport path 19*b*. The medium P is transported along with the rotation of the transport belt 61 in a state of electrostatic attraction to a support surface which is an outer circumferential surface of the transport belt 61.

The second printing section 54 includes the ejection section 54*h* that performs printing by ejecting ink supplied from an ink tank (not shown) onto the medium P. The ejection section 54*h* is positioned on the +Z direction side of the transport belt 61 and is provided at a position facing the transport belt 61 with the second transport path 19*b* interposed therebetween in the Z-axis direction. The second printing section 54 deposits ink on the medium P by, based on the print data, ejecting ink from the ejection section 54*h* onto the medium P supported and transported by the transport belt 61. Thus, an image based on the print data is formed on the medium P.

The ejection section 54*h* included in the second printing section 54 of the present embodiment is a so-called line head capable of simultaneously ejecting ink across the width direction of the medium P, which is the X-axis direction. Note that the print data is data for causing the second printing section 54 to execute printing, which is generated based on image data to be printed on the medium P. The image data includes text data and data of images.

The second in-machine inversion section 55 is provided in the second printing machine 200 so as to be able to inverse the front and the rear of the medium P. The second in-machine inversion section 55 is composed of the inversion path 64, the merging path 65, and transport roller pairs 68, guide flaps 69, and a transport motor 68*m* included in these paths. Drive of the second in-machine inversion section 55 is controlled by the control section 92 when the inversion process of the medium P is performed in the second printing machine 200.

The transport roller pairs 68 are provided at various positions in the inversion path 64, the merging path 65, and the discharge path 66, and are driven by the transport motor 68*m*. The guide flaps 69 are provided at a branch point between the second transport path 19*b* and the inversion path 64, a branch point between the second transport path 19*b* and the discharge path 66, and a connection point between the inversion path 64 and the merging path 65. The guide flaps 69 are pivoted by solenoids (not shown) and guide the transport direction of the medium P transported to each branch point or connection point in the transport path.

The control section 92 includes a central processing unit (CPU, not shown), a storage section, and the like. The CPU can execute various programs stored in the storage section and can perform various judgments, various instructions, and the like. The storage section stores, for example, various programs, various tables, and the like for performing drive control of the feeding section 52, drive control of the transport section 53, ejection control of the ejection section 54*h* in the second printing section 54, and the like when printing is performed on the medium P. The control section 92 has a communication function with the control sections 90, 91, 93, and 94. The control section 92 performs drive control of the feeding section 52, the transport section 53, the second printing section 54, and the like in cooperation with the control sections 90, 91, 93, and 94.

For example, the control section 92 performs printing on the medium P by performing drive control of the feeding section 52, the transport section 53, the second printing section 54, and the like. For example, the control section 92 sends out the medium P to the discharge section 67 by controlling drive of the transport roller pairs 68 provided in the discharge path 66 and the guide flaps 69 provided in the second transport path 19*b*. For example, the control section 92 performs the inversion process of the medium P in the second printing machine 200 by controlling drive of the transport roller pairs 68 and the guide flaps 69, which constitute the second in-machine inversion section 55.

Figure 5:
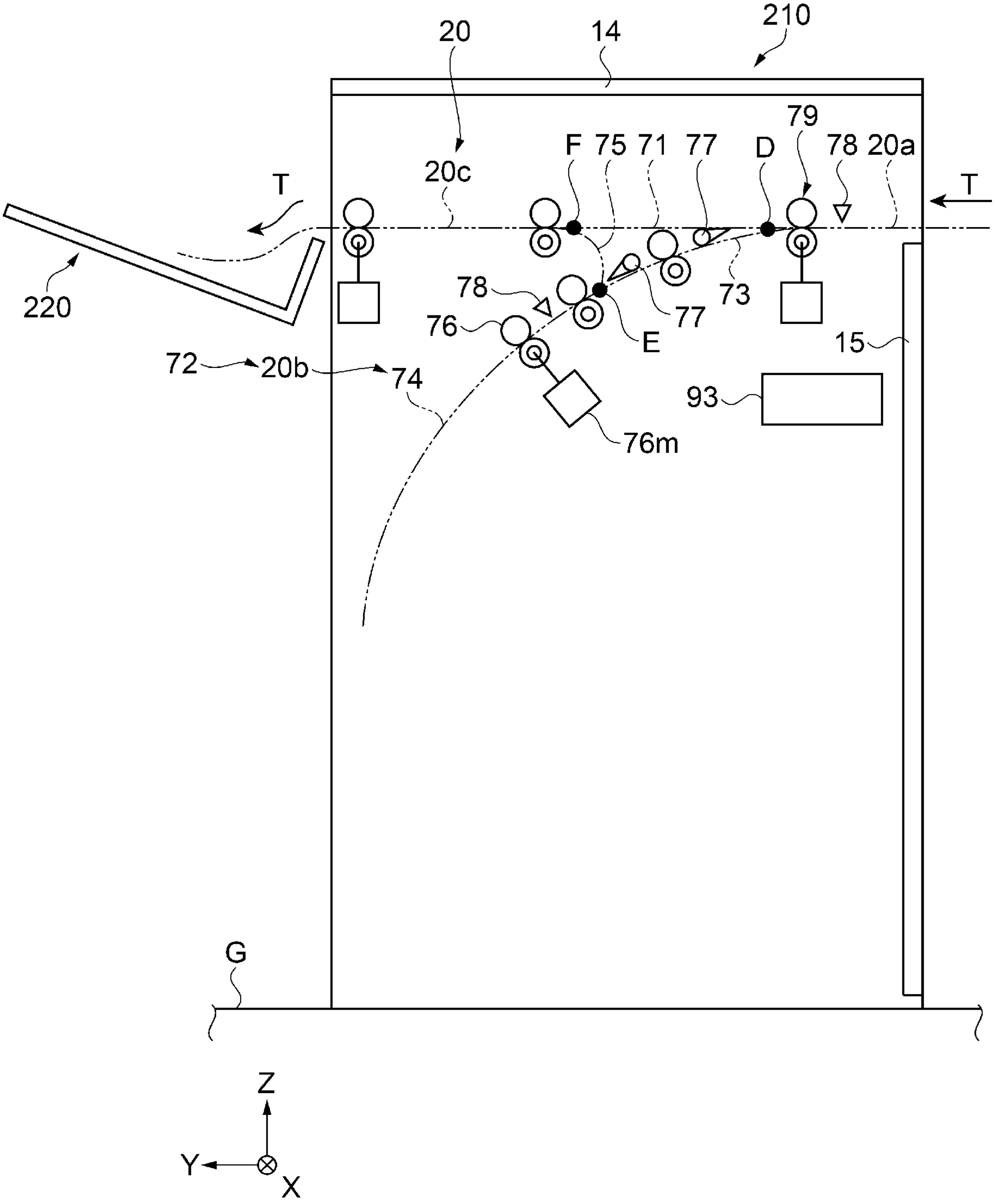
FIG. 5 is a schematic diagram showing a second inversion device in the printing system.

As shown in FIGS. 1 and 5, the second inversion device 210 includes the transport path 20, a second in-device inversion section 72, a transport section 79, a second cover 14, a first cover 15, the placement section 220, and the control section 93. The second inversion device 210 configures the transport path 20 in which the first surface and the second surface of the medium P are inversed and transported.

As shown in FIG. 5, the transport path 20 is composed of the pre-inversion path 20*a*, an inversion path 20*b*, a post-inversion path 20*c*, and a bypass transport section 71. The upstream end of the pre-inversion path 20*a* is connected to the transport path 19 of the second printing machine 200, and the medium P is introduced therein. A downstream end of the pre-inversion path 20*a* is connected to an upstream end of the inversion path 20*b* and an upstream end of the bypass transport section 71 at a branch point D. The inversion path 20*b* includes a branch path 73, an inversion path end section 74, and a merging path 75. The branch path 73 is a transport path from the branch point D to a connection point E. The merging path 75 is a transport path from the connection point E to a merge point F.

An upstream end of the post-inversion path 20*c* is connected to a downstream end of the merging path 75 and the downstream end of the bypass transport section 71 at the merge point F. The medium P inversed in the inversion path 20*b* or the medium P transported from the bypass transport section 71 is transported to the post-inversion path 20*c*. The downstream end of the post-inversion path 20*c* is opened in the +Y direction side surface of the second inversion device 210. The placement section 220 is provided at a position on the +Y direction side with respect to the side surface on the +Y direction side of the second inversion device 210. As a result, the medium P sent out from the downstream end of the post-inversion path 20*c* is placed on the placement section 220.

The transport section 79 is composed of transport roller pairs 76, a sensor 78, and a guide flap 77 provided at the branch point D. The transport section 79 is controlled to be driven by the control section 93, transports the medium P along the transport path 20, and sends out the medium P to the placement section 220.

The transport roller pairs 76 are provided at various positions in the transport path 20 and are driven by a transport motor 76*m*. The sensors 78 are provided in the pre-inversion path 20*a* and detect the medium P to be transported to the pre-inversion path 20*a*. The guide flap 77 is provided at the branch point D and guides the transport direction of the medium P to be transported. The guide flap 77 is pivoted by a solenoid (not shown) and guides the transport direction of the medium P at the branch point of the transport path.

The second in-device inversion section 72 is provided in the second inversion device 210 so as to be able to inverse the front and the rear of the medium P. The second in-device inversion section 72 is composed of the branch path 73, the inversion path end section 74, the merging path 75, the transport roller pairs 76 included in these paths, a guide flap 77 provided at a branch point E, and a sensor 78. The sensor 78 is provided in the inversion path end section 74, and detects the medium P transported to the inversion path end section 74 or the medium P sent out from the inversion path end section 74 to the merging path 75.

The second cover 14 is provided on the housing of the second inversion device 210 and is pivotable around an axis along the Y-axis. By pivoting, the second cover 14 can be displaced between an open position shown in FIG. 5 and a closed position (not shown). The open position of the second cover 14 is a position at which the pre-inversion path 20*a*, the bypass transport section 71, and the post-inversion path 20*c* are accessible. The closed position of the second cover 14 is a position at which the −X direction side of the pre-inversion path 20*a*, the bypass transport section 71, and the post-inversion path 20*c* are covered.

The first cover 15 is provided on the housing of the second inversion device 210 and is pivotable around an axis along the Z-axis. By pivoting, the first cover 15 can be displaced between an open position shown in FIG. 5 and a closed position (not shown). The open position of the first cover 15 is a position at which the second in-device inversion section 72 is accessible. The closed position of the first cover 15 is a position at which the −X direction side of the second in-device inversion section 72 is covered.

The control section 93 includes a central processing unit (CPU, not shown), a storage section, and the like. The CPU can execute various programs stored in the storage section and can perform various judgments, various instructions, and the like. The storage section stores, for example, various programs for performing drive control and the like of the second in-device inversion section 72 when the inversion process of the medium P is performed, various tables, and the like.

The control section 93 has a communication function with the control sections 90, 91, 92, and 94. The control section 93 controls drive of the transport roller pairs 76, the sensor 78, and the guide flaps 77 in cooperation with the control sections 90, 91, 92, and 94, and performs the inversion process of the medium P.

In the inversion process, the medium P introduced into the pre-inversion path 20*a* is transported from the branch path 73 to the post-inversion path 20*c* via the inversion path end section 74 and the merging path 75. Note that when the inversion process of the medium P is not performed, the control section 93 transports the medium P introduced to the pre-inversion path 20*a* to the post-inversion path 20*c* via the bypass transport section 71 provided between the branch point D and the merge point F.

Figure 6:
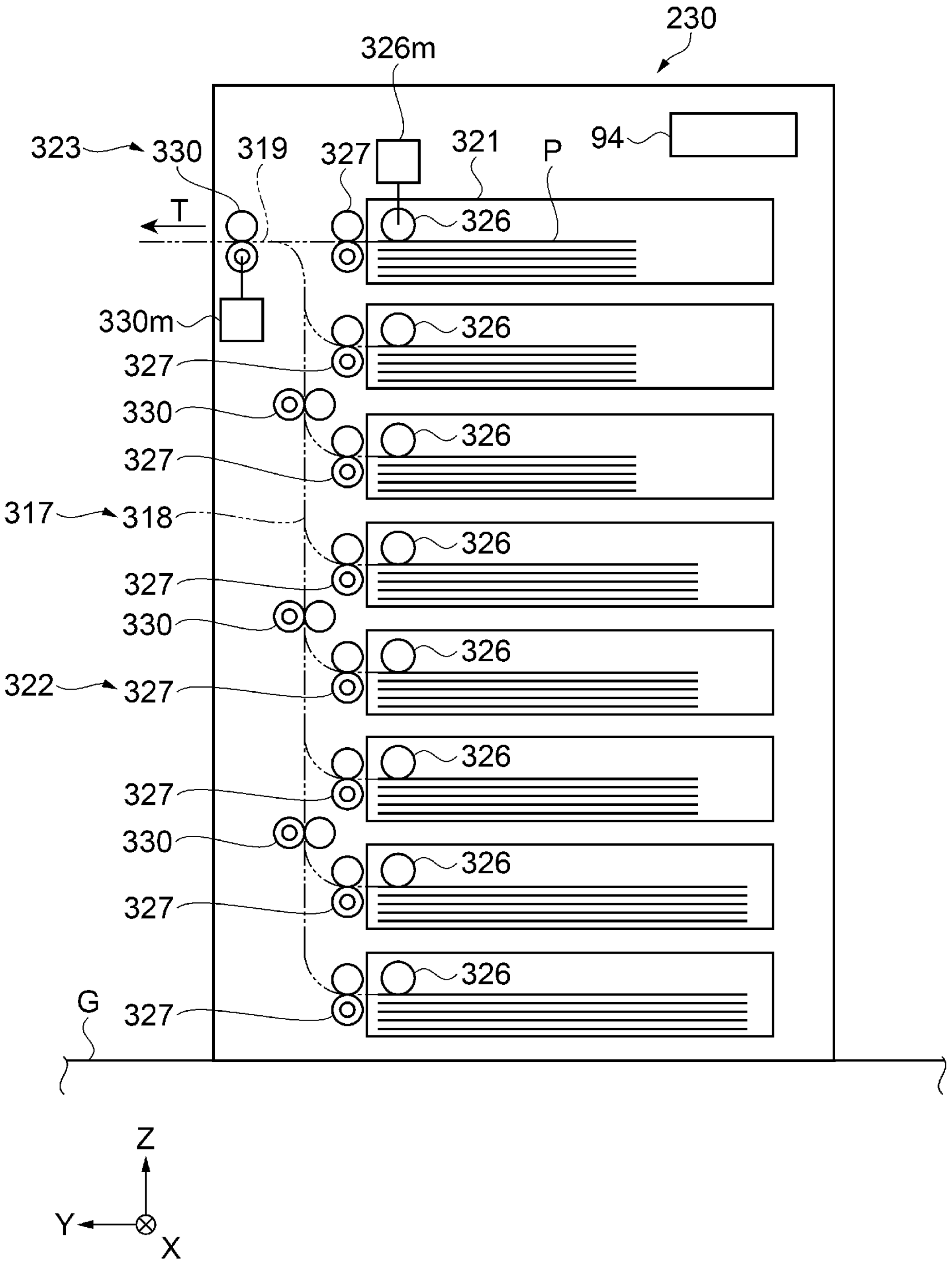
FIG. 6 is a schematic diagram showing a medium accommodation device in the printing system.

As shown in FIGS. 1 and 6, the medium accommodation device 230 includes the transport path 317, a medium accommodation section 321, a feeding section 322, a transport section 323, and a control section 94.

The transport path 317 includes a supply path 318 and the feed out path 319. The supply path 318 is a transport path that connects the medium accommodation section 321 and the feed out path 319. The downstream end of the feed out path 319 continuing from the supply path 318 is connected to the first connection path 17*c* constituting the transport path 17 of the first printing machine 100.

The medium accommodation section 321 is a cassette-type accommodation section capable of accommodating the medium P in a stacked state. In the medium accommodation device 230, at least one (eight in FIG. 6) medium accommodation section 321 is provided to be detachable from and attachable to the medium accommodation device 230 from the −X direction side of the medium accommodation device 230. The medium accommodation device 230 of the present embodiment includes a larger number of medium accommodation sections 321 than the number of first medium accommodation sections 21 included in the first printing machine 100. The medium accommodation device 230 of the present embodiment can accommodate a larger number of sheets of the medium P in the medium accommodation section 321 than the number of sheets of the medium P which can be accommodated in the first medium accommodation section 21 by the first printing machine 100.

As illustrated in FIG. 6, the feeding section 322 feeds the medium P accommodated in the medium accommodation section 321 to the feed out path 319 via the supply path 318. The feeding section 322 includes pickup rollers 326, separation roller pairs 327, and transport roller pairs 330.

The pickup roller 326 rotates along with the driving of a feed motor 326*m*. Accordingly, the pickup roller 326 feeds out the uppermost medium P among the medium P disposed in a stacked state in the medium accommodation section 321 to the downstream side. The separation roller pair 327 separates the medium P fed out by the pickup roller 326 one by one. The transport roller pair 330 is provided in the supply path 318. The transport roller pair 330 rotates along with the driving of a transport motor 330*m*. As a result, the transport roller pair 330 transports the medium P in the direction toward the feed out path 319.

The transport section 323 sends out the medium P fed by the feeding section 322 to the first connection path 17*c* of the first printing machine 100 via the feed out path 319. The transport section 323 includes the transport roller pair 330. The transport roller pair 330 rotates along with the driving of the transport motor 330*m*. Thus, the transport roller pair 330 transports the medium P along the feed out path 319.

The control section 94 includes a central processing unit (CPU, not shown), a storage section, and the like. The CPU can execute various programs stored in the storage section and can perform various judgments, various instructions, and the like. The storage section stores, for example, various programs for performing drive control of the feeding section 322, drive control of the transport section 323, and the like when the medium P is sent to the first connection path 17*c* of the first printing machine 100, various tables, and the like.

The control section 94 has a communication function with the control sections 90, 91, 92, and 93. When printing is performed on the medium P in cooperation with the control sections 90, 91, 92, and 93, the control section 94 sends out the medium P to the first connection path 17*c* of the first printing machine 100 by performing drive control of the pickup rollers 326, the separation roller pairs 327, the transport roller pairs 330, and the like.

Next, ink as a printing material for performing printing on the medium P will be described. The ink of the present embodiment is an aqueous ink composition in which the main solvent of the ink is water. As water, pure water or ultrapure water such as ion-exchanged water, ultrafiltered water, reverse osmosis water, or distilled water is desirably used. In particular, it is desirable to use water sterilized by ultraviolet irradiation or addition of hydrogen peroxide from the viewpoint of enabling long-term storage of the ink by preventing generation of mold or bacteria. From the viewpoint of securing appropriate physical properties such as the viscosity of the ink and securing the stability and reliability of the ink, water is desirably contained in the ink composition in an amount of 10% by mass to 75% by mass.

The ink includes inks corresponding to full-color printing, for example, inks such as cyan, magenta, and yellow ink, black ink, white ink, and the like, and each ink includes a coloring material. As the coloring material, the ink of each color contains at least one selected from a pigment, a dye, a metal oxide, and the like. The pigment is not particularly limited, and examples thereof include an inorganic pigment for black, an organic pigment, and an organic pigment of each color such as yellow, magenta, and cyan. As the dye, various dyes such as direct dyes, acid dyes, food dyes, basic dyes, reactive dyes, disperse dyes, vat dyes, soluble vat dyes, and reactive disperse dyes can be used as dyes of various colors such as yellow, magenta, and cyan.

The ink may contain a water-soluble organic solvent, a polyhydric alcohol, a betaine, a saccharide, a urea, a surfactant, or the like in addition to the coloring material to obtain predetermined ink characteristics. The predetermined ink characteristics include wettability and permeability of the ink to the medium P, curling with respect to the medium P, cockling suitability, strike-through suitability, clogging suitability in ink ejection, suitability of viscosity characteristics according to the temperature of the ink, and the like. The strike-through suitability refers to a property suitable for preventing the ink from excessively permeating into the medium P to strike through.

Specifically, for example, the water-soluble organic solvents include 1,2-alkanediols, glycol ethers, pyrrolidone derivatives, or the like and the polyhydric alcohols include glycerin, 1,2,6-hexanetriol, diethylene glycol, triethylene glycol, tetraethylene glycol, and dipropylene glycol, or the like can be used. As the surfactant, a fluorine-based surfactant, an acetylene glycol-based surfactant, a silicon-based surfactant, or the like can be used.

When the pigment is contained in the ink, a dispersant for dispersing the pigment may be added as another component. In order to further improve the characteristics of the ink, a pH adjusting agent, a complexing agent, an antifoaming agent, an antioxidant, an ultraviolet absorber, an antiseptic/antifungal agent, or the like may be added to the ink.

When the medium P includes fibers, such as cellulose, that absorb moisture, the medium P may be deformed by the water included in the ink. In particular, in the case of printing using a water-based ink containing 50% by mass or more of water, this phenomenon may remarkably appear.

For example, when the ink is applied to the first surface, which serves as the printing surface of the medium P, the water contained in the ink permeates the first surface, and the fibers constituting the first surface side of the medium P expand. As a result, due to the swelling of the first surface side, the medium P may curl so as to form a convex shape state on the first surface side. The direction in which the medium P is curled in a convex shape state with respect to the transport direction T varies depending on the configuration specification of the medium P or the direction in which the medium P is set in the printing system 1. As the first surface of the medium P dries, the stretched fibers contract and the degree of curl may be reduced. Sometimes the fibers further contract when drying, resulting in secondary curling, which reversely curls.

The amount of deformation, which is the degree of such curling, varies depending on various factors. The various factors are, for example, the material and thickness of the medium P, and in the case where the medium P is formed of a plurality of layers, the constituent specifications of the layers. The various factors are, for example, the environment, such as temperature and humidity, in which the printing system 1 is used, printing time, time elapsed after printing, that is, a drying time, and water content of the medium P at the printing start time point or a drying start time point. The various factors include, for example, the water content of the ink, ink specifications such as ink temperature, an ink application amount to the medium P, and the shape and size of the ink application area. A curl amount and a secondary curl amount vary depending on these specifications and degrees.

In the printing of the print data on the medium P, the application amount of the ink applied to a surface of the medium P on which the print data is printed changes according to the print duty of the print data. When the print duty of the print data increases, the application amount of the ink applied to the surface of the medium P on which the print data is printed increases.

For example, it is assumed that different print data is successively printed on both surfaces of the medium P by the printing system 1. In this case, there will be both medium P on which the print data with the higher print duty is printed on the first surface by the first printing section 24 and medium P on which the print data with the lower print duty is printed on the first surface by the first printing section 24. As a result, the drying degree of the printing with the higher print duty and printing with the lower print duty is different, and the curl state is different for each double-sided printed medium P. Since the curl state differs for each double-sided printed medium P, there is a concern that consistency between sheets of the medium P may deteriorate.

For example, in the printing system 1 of the present embodiment, it is assumed that the print data is printed on both surfaces of the medium P. In this case, in the present embodiment, the control section 90 determines the specification of the printing process based on the print duty of each of the print data to be printed on one surface of the medium P and the print data to be printed on the other surface of the medium P. That is, the control section 90 determines which of the print data to be printed on one surface of the medium P and the print data to be printed on the other surface of the medium P is to be printed first by the first printing section 24 and later by the second printing section 54.

Among the print data to be printed on one surface of the medium P and the print data to be printed on the other surface of the medium P, the print data having a higher print duty is referred to as print data PD2, and the print data having a lower print duty is referred to as print data PD1. The print data PD1 is print data to be printed on the side of the medium P that is the preceding page. That the print data PD2 is print data to be printed on the side of the medium P that is the subsequent page. In this printing process, it is assumed that the medium P which is sent out from the post-inversion path 20*c* of the second inversion device 210 is placed on the placement section 220 in a direction in which the surface that is the preceding page of the medium P becomes the lower surface which is the surface on the −Z direction side.

In the printing process in which printing is performed on both surfaces of a plurality of medium P, the printing system 1 suppresses the deterioration of the consistency between sheets of the medium P by taking a longer time after printing of the print data PD2 before placing the medium P on the placement section 220. In this case, the control section 90 causes the first printing section 24 of the first printing machine 100 to print the print data PD2 and causes the second printing section 54 of the second printing machine 200 to print the print data PD1.

Alternatively, the printing system 1 may suppress the deterioration of the consistency between the plurality of medium P by reducing the difference in time from the printing of the print data PD2 to the placement of the medium P on the placement section 220 between the medium P. In this case, the control section 90 causes the first printing section 24 of the first printing machine 100 to print the print data PD1 and causes the second printing section 54 of the second printing machine 200 to print the print data PD2.

First, a description will be made of a flow of a printing process when the print data PD2 is printed by the first printing section 24 of the first printing machine 100 and the print data PD1 is printed by the second printing section 54 of the second printing machine 200. First, by controlling the feeding section 22, the control section 90 transports the medium P from the first medium accommodation section 21 toward the first transport path 17*b* via the supply path 17*a*. Then, by controlling the transport section 23 and the first printing section 24, the control section 90 ejects ink from the ejection section 24*h* onto the first surface of the medium P to print the print data PD2. Then, by controlling the transport section 23, the control section 90 transports the medium P having the print data PD2 printed on the first surface toward the first inversion device 110.

Then, by controlling the transport section 49 and the first in-device inversion section 42 of the first inversion device 110, the control section 90 inverses the front and the rear of the medium P printed on the first surface. Then, by controlling the transport section 49, the control section 90 transports the medium P, which was inversed into an orientation in which the second surface is the upper surface, which is the surface on the +Z direction side, toward the second printing machine 200.

Then, by controlling the transport section 53 of the second printing machine 200, the control section 90 transports the medium P toward the second transport path 19*b* via the second connection path 19*c*. Then, by controlling the transport section 53 and the second printing section 54, the control section 90 ejects ink from the ejection section 54*h* onto the second surface of the medium P to print the print data PD1. Then, by controlling the transport section 53, the control section 90 transports the medium P having the print data PD1 printed on the second surface toward the second inversion device 210.

In the medium P transported to the pre-inversion path 20*a* of the second inversion device 210, the second surface on which the print data PD1 is printed is the upper surface. Therefore, by controlling the transport section 79 and the second in-device inversion section 72 of the second inversion device 210, the control section 90 inverses the medium P on which the print data PD1 is printed on the second surface. Then, by controlling the transport section 79, the control section 90 sends out the medium P, which was inversed into an orientation in which the second surface on which the print data PD1 is printed is the lower surface, toward the placement section 220.

As a result, the medium P sent out from the post-inversion path 20*c* is placed on the placement section 220 in an orientation in which the surface that is the preceding page of the medium P is the lower surface. Accordingly, even when double-sided printing is performed on a plurality of medium P, the plurality of medium P sent out from the post-inversion path 20*c* is stacked on the placement section 220 in an orientation in which the surface that is the preceding page of the medium P is the lower surface.

Next, a description will be made of a flow of a printing process when the print data PD1 is printed by the first printing section 24 of the first printing machine 100 and the print data PD2 is printed by the second printing section 54 of the second printing machine 200. First, by controlling the feeding section 22, the control section 90 transports the medium P from the first medium accommodation section 21 toward the first transport path 17*b* via the supply path 17*a*. Then, by controlling the transport section 23 and the first printing section 24, the control section 90 ejects ink from the ejection section 24*h* onto the first surface of the medium P to print the print data PD1. Then, by controlling the transport section 23, the control section 90 transports the medium P having the print data PD1 printed on the first surface toward the first inversion device 110.

Then, by controlling the transport section 49 and the first in-device inversion section 42 of the first inversion device 110, the control section 90 inverses the medium P printed on the first surface. Then, by controlling the transport section 49, the control section 90 transports the medium P, which was inversed into an orientation in which the second surface is the upper surface, toward the second printing machine 200.

Then, by controlling the transport section 53 of the second printing machine 200, the control section 90 transports the medium P toward the second transport path 19*b* via the second connection path 19*c*. Then, by controlling the transport section 53 and the second printing section 54, the control section 90 ejects ink from the ejection section 54*h* onto the second surface of the medium P to print the print data PD2. Then, by controlling the transport section 53, the control section 90 transports the medium P having the print data PD2 printed on the second surface toward the second inversion device 210.

In the medium P transported to the pre-inversion path 20*a* of the second inversion device 210, the second surface on which the print data PD2 is printed is the upper surface. Therefore, by controlling the transport section 79 of the second inversion device 210, the control section 90 sends out the medium P, the second surface of which remains the upper surface, toward the placement section 220 via the pre-inversion path 20*a*, the bypass transport section 71, and the post-inversion path 20*c*. That is, the control section 90 sends out the medium P, on which the print data PD2 is printed on the second surface in the second printing machine 200, to the placement section 220 without inversing the front and the rear sides of the medium P.

As a result, the medium P sent out from the post-inversion path 20*c* is placed on the placement section 220 in an orientation in which the surface that is the preceding page of the medium P is the lower surface. Accordingly, even when double-sided printing is performed on a plurality of medium P, the plurality of medium P sent out from the post-inversion path 20*c* is stacked on the placement section 220 in an orientation in which the surface that is the preceding page of the medium P is the lower surface.

When the print data is to be printed on both surfaces of the medium P, the user selects which of the print data PD1 and PD2 is to be printed first by the first printing section 24 and which is to be printed later by the second printing section 54 through the operation section 11. In this case, the control section 90 determines which of the print data PD1 and PD2 is to be printed first by the first printing section 24 and which is to be printed later by the second printing section 54 based on the selection of the user.

In the printing system 1 of the present embodiment, the user can select a print mode for printing on both surfaces of the medium P by operating the operation section 11. The print mode includes a high-speed mode and a low-speed mode. When the print mode is not selected by the user, as described above, the control section 90 causes the first in-device inversion section 42 to perform the inversion process of the medium P which is performed before the medium P is transported to the second printing machine 200. When the high-speed mode is selected by the user, in the same manner as the printing process described above, the control section 90 causes the first in-device inversion section 42 to perform the inversion process of the medium P which is performed before the medium P is transported to the second printing machine 200. When inversing the front and the rear of the medium P printed on the second surface, as in the printing process described above, the control section 90 causes the second in-device inversion section 72 of the second inversion device 210 to inverse the front and the rear of the medium P printed on the second surface.

On the other hand, when the low-speed mode is selected by the user, the control section 90 causes the first in-machine inversion section 25 of the first printing machine 100 to perform the inversion process of the medium P which is performed before the medium P is transported to the second printing machine 200. In this case, by controlling the transport section 23 and the first in-machine inversion section 25, the control section 90 inverses the front and the rear of the medium P printed on the first surface. Then, by controlling the transport section 23, the control section 90 transports the medium P that was inversed in the orientation in which the second surface is the upper surface, toward the first inversion device 110.

Then, by controlling the transport section 49 of the first inversion device 110, the control section 90 transports the medium P, the second surface of which remains the upper surface, toward the second printing machine 200 via the pre-inversion path 18*a*, the bypass transport section 41, and the post-inversion path 18*c*. Accordingly, as in the printing process described above, printing on the second surface of the medium P is performed by the second printing section 54. When inversing the front and the rear of the medium P printed on the second surface, by controlling the transport section 53 and the second in-machine inversion section 55, of the second printing machine 200, the control section 90 inverses the front and the rear sides of the medium P printed on the second surface. Then, by controlling the transport section 53, the control section 90 transports the medium P, which was inversed by the second in-machine inversion section 55 into an orientation in which the first surface is the upper surface, toward the second inversion device 210. Then, by controlling the transport section 79 of the second inversion device 210, the control section 90 sends out the medium P having the first surface as the upper surface toward the placement section 220 via the pre-inversion path 20*a*, the bypass transport section 71, and the post-inversion path 20*c*.

In the printing system 1 of the present embodiment, it is possible to perform printing on both surfaces of the medium P by performing the same printing process as in the low-speed mode in a state in which an abnormality has occurred in the first in-device inversion section 42 of the first inversion device 110. In this case, the control section 90 causes the first in-machine inversion section 25 of the first printing machine 100 to perform the inversion process of the medium P which is performed before the medium P is transported to the second printing machine 200 via the bypass transport section 41. When inversing the front and the rear of the medium P printed on the second surface, the control section 90 causes the second in-machine inversion section 55 of the second printing machine 200 to inverse the medium P. Alternatively, in this case, the control section 90 performs the same printing process as in the low-speed mode until printing on the second surface of the medium P by the second printing machine 200. When inversing the front and the rear of the medium P printed on the second surface, the control section 90 may cause the second in-device inversion section 72 of the second inversion device 210 to inverse the medium P.

Next, single-sided printing in which print data is printed on only one surface of the medium P in the printing system 1 of the present embodiment will be described. In the present embodiment, in the single-sided printing, when the print duty of the print data is equal to or greater than the set value S1, the control section 90 causes the first printing section 24 to print the print data on the medium P conveyed from the first medium accommodation section 21 in the first printing machine 100. In the single-sided printing, when the print duty is less than the set value S1, the control section 90 causes the second printing section 54 to print the print data on the medium P transported from the second medium accommodation section 51. The set value S1 is a judgment value for estimating whether or not the degree of the curl of the medium P placed on which the single-sided printing is performed and which is placed on the placement section 220 exceeds a tolerance range. For example, when the print duty of the print data is equal to or greater than the set value S1, the degree of the curl of the medium P placed on the placement section 220 may exceed the tolerance range.

Here, the flow of the printing process in the single-sided printing when the print duty of the print data is equal to or greater than the set value S1 will be described. First, by controlling the feeding section 22 of the first printing machine 100, the control section 90 transports the medium P from the first medium accommodation section 21 to the first transport path 17*b* via the supply path 17*a*. Then, by controlling the transport section 23 and the first printing section 24, the control section 90 ejects ink from the ejection section 24*h* onto the first surface of the medium P to print the print data. Then, by controlling the transport section 23, the control section 90 transports the medium P having the print data printed on the first surface toward the first inversion device 110.

Then, by controlling the transport section 49 of the first inversion device 110, the control section 90 transports the medium P, the first surface of which remains the upper surface, toward the second printing machine 200 via the pre-inversion path 18*a*, the bypass transport section 41, and the post-inversion path 18*c*. That is, the control section 90 transports the medium P toward the second printing machine 200 without inversing the front and the rear of the medium P printed on the first surface. Then, by controlling the transport section 53 of the second printing machine 200, the control section 90 transports the medium P toward the second inversion device 210 via the second connection path 19*c* and the second transport path 19*b*.

In the medium P transported to the pre-inversion path 20*a* of the second inversion device 210, the first surface on which the print data is printed is the upper surface. In this printing process, when the medium P is to be placed on the placement section 220 with the surface on which the print data is printed facing down, the control section 90 inverses the front and rear of the medium P by controlling the transport section 79 and the second in-device inversion section 72 of the second inversion device 210. In this printing process, when the medium P is to be placed on the placement section 220 with the surface on which the print data is printed facing up, the control section 90 does not inverse the front and the rear of the medium P in the second inversion device 210. That is, by controlling the transport section 79, the control section 90 sends out the medium P, which has the first surface as the upper surface, toward the placement section 220 via the pre-inversion path 20*a*, the bypass transport section 71, and the post-inversion path 20*c*.

As a result, the medium P sent out from the post-inversion path 20*c* is placed on the placement section 220 with a front and rear orientation corresponding to the specification of the printing process. Accordingly, even when printing is performed on one surface of the plurality of medium P, the plurality of medium P sent out from the post-inversion path 20*c* is stacked on the placement section 220 in the front and the rear orientation corresponding to the specification of the printing process. Note that in the printing system 1 of the present embodiment, even in a state where an abnormality occurs in the first in-device inversion section 42 of the first inversion device 110, it is possible to perform the printing process performed in the above-described single-sided printing.

Next, the flow of the printing process in the single-sided printing when the print duty of the print data is less than the set value S1 will be described. First, by controlling the feeding section 52 of the second printing machine 200, the control section 90 transports the medium P from the second medium accommodation section 51 to the second transport path 19*b* via the supply path 19*a*. Then, by controlling the transport section 53 and the second printing section 54, the control section 90 ejects ink from the ejection section 54*h* onto the first surface of the medium P to print the print data. Then, by controlling the transport section 53, the control section 90 transports the medium P having the print data printed on the first surface toward the second inversion device 210.

In the medium P transported to the pre-inversion path 20*a* of the second inversion device 210, the first surface on which the print data is printed is the upper surface. In this printing process, when the medium P is to be placed on the placement section 220 with the surface on which the print data is printed facing down, the control section 90 inverses the front and rear of the medium P by controlling the transport section 79 and the second in-device inversion section 72 of the second inversion device 210. In this printing process, when the medium P is to b e placed on the placement section 220 with the surface on which the print data is printed facing up, the control section 90 does not inverse the front and the rear of the medium P in the second inversion device 210. That is, by controlling the transport section 79, the control section 90 sends out the medium P, which has the first surface as the upper surface, toward the placement section 220 via the pre-inversion path 20*a*, the bypass transport section 71, and the post-inversion path 20*c*.

As a result, the medium P sent out from the post-inversion path 20*c* is placed on the placement section 220 with a front and rear orientation corresponding to the specification of the printing process. Accordingly, even when printing is performed on one surface of the plurality of medium P, the plurality of medium P sent out from the post-inversion path 20*c* is stacked on the placement section 220 in the front and the rear orientation corresponding to the specification of the printing process. Note that even in a state in which an abnormality occurs in the first in-device inversion section 42 of the first inversion device 110, the control section 90 performs the above described printing process, which is the same as the printing process performed in the single-sided printing when the print duty of the print data is equal to or greater than the set value S1. Even in a state in which an abnormality occurs in the first in-device inversion section 42, the control section 90 performs the above described printing process, which is the same as the printing process performed for single-sided printing when the print duty of the print data is less than the set value S1. When the printing data is printed on only one surface of the medium P, the control section 90 may cause the second printing section 54 to print the print data on the medium P transported from the second medium accommodation section 51 regardless of the print duty of the print data.

Note that the application amount of ink to be applied to the surface of the medium P on which the print data is printed changes in accordance with the print duty of the print data. For this reason, the set value S1 may not be a judgment value to be compared with the print duty of the print data, but may be a judgment value to be compared with the application amount of the ink to be applied to the surface of the medium P on which the print data is printed. Then, the control section 90 may determine the specification of the printing process in the single-sided printing based on the set value S1.

In the printing system 1 of the present embodiment, the medium P to be printed by the first printing section 24 in the first printing machine 100 can be supplied from the medium accommodation section 321 of the medium accommodation device 230. In this case, by controlling the feeding section 322 and the transport sections 323 and 23, the control section 90 transports the medium P from the medium accommodation section 321 toward the first transport path 17*b* via the transport path 317 and the first connection path 17*c*.

In the printing system 1 of the present embodiment, the medium P to be printed by the first printing section 24 in the first printing machine 100 can be supplied from the second medium accommodation section 51 of the second printing machine 200. In this case, by controlling the feeding sections 52, 82, and 22, the control section 90 transports the medium P from the second medium accommodation section 51 to the first transport path 17*b* via the supply paths 19*a*, 19*d*, 18*d*, 17*d*, and 17*a*.

In the printing system 1 of the present embodiment, the medium P to be printed by the first printing section 24 in the first printing machine 100 can be supplied from the medium accommodation section 81 of the first inversion device 110. In this case, by controlling the feeding sections 82 and 22, the control section 90 transports the medium P from the medium accommodation section 81 to the first transport path 17*b* via the supply paths 18*d*, 17*d*, and 17*a*.

In the printing system 1 of the present embodiment, the medium P printed by the second printing section 54 in the second printing machine 200 can be supplied from the medium accommodation section 321 of the medium accommodation device 230. In this case, by controlling the feeding section 322 and the transport sections 323, 23, 49, and 53, the control section 90 transports the medium P from the medium accommodation section 321 toward the second transport path 19*b* via the transport paths 317, 17, and 18 and the second connection path 19*c*.

In the printing system 1 of the present embodiment, the medium P to be printed by the second printing section 54 in the second printing machine 200 can be supplied from the first medium accommodation section 21 of the first printing machine 100. In this case, by controlling the feeding sections 22, 82, and 52, the control section 90 transports the medium P from the first medium accommodation section 21 to the second transport path 19*b* via the supply paths 17*a*, 17*d*, 18*d*, 19*d*, and 19*a*.

In the printing system 1 of the present embodiment, the medium P printed by the second printing section 54 in the second printing machine 200 can be supplied from the medium accommodation section 81 of the first inversion device 110. In this case, by controlling the feeding sections 82 and 52, the control section 90 transports the medium P from the medium accommodation section 81 toward the second transport path 19*b* via the supply paths 18*d*, 19*d*, and 19*a*.

As described above, according to the printing system 1 of the first embodiment, the following effects can be obtained.

The printing system 1 includes the first printing machine 100 having the first printing section 24 configured to print on the medium P transported in the transport direction T and the first in-machine inversion section 25 configured to inverse the medium P printed by the first printing section 24.

The printing system 1 includes the first inversion device 110 that is provided downstream of the first printing machine 100 in the transport direction T and that is configured to inverse the medium P.

The printing system 1 includes the second printing machine 200 that is provided downstream of the first inversion device 110 in the transport direction T and that has the second printing section 54 configured to print on the medium P.

The printing system 1 includes the control section 90. The first inversion device 110 includes the first in-device inversion section 42 configured to inverse the medium P and the bypass transport section 41 configured to transport the medium P from the first printing machine 100 toward the second printing machine 200 without passing through the first in-device inversion section 42.

Then, when printing is performed on both surfaces of the medium P in a state where an abnormality has occurred in the first in-device inversion section 42, the control section 90 transports the medium P inversed by the first in-machine inversion section 25 toward the second printing machine 200 via the bypass transport section 41.

According to this, even when an abnormality occurs in the first in-device inversion section 42 of the first inversion device 110, it is possible to continue transport of the medium P from the first printing machine 100 toward the second printing machine 200 via the bypass transport section 41. Therefore, it is possible to suppress an increase in downtime since printing by the first printing section 24 and the second printing section 54 cannot be continued.

The printing system 1 further includes the first cover 13 configured to be displaced between a position that covers the first in-device inversion section 42 and a position that enables access to the first in-device inversion section 42.

The printing system 1 further includes the second cover 12 configured to be displaced between a position that covers the bypass transport section 41 and a position that enables access to the bypass transport section 41.

According to this, when an abnormality occurs in the first in-device inversion section 42, it is possible to release an abnormality of the first in-device inversion section 42 while transporting the medium P by the bypass transport section 41. When an abnormality occurs in the bypass transport section 41, it is possible to release an abnormality of the bypass transport section 41 while using the first in-device inversion section 42. Therefore, it is possible to suppress an increase in downtime since printing cannot be continued due to the occurrence of an abnormality in the first inversion device 110.

When printing is performed on only one surface of the medium P in a state where an abnormality has occurred in the first in-device inversion section 42, the control section 90 causes the second printing section 54 to perform printing.

Accordingly, when an abnormality occurs in the first in-device inversion section 42, it is possible to preferentially use the printing process of the medium P by the second printing section 54.

When printing is performed on only one surface of the medium P in a state where an abnormality has occurred in the first in-device inversion section 42, the control section 90 transports the medium P printed by the first printing section 24 toward the second printing machine 200 via the bypass transport section 41.

Accordingly, even when an abnormality occurs in the first in-device inversion section 42, it is possible to preferentially use the printing process of the medium P by the first printing section 24.

The printing system 1 further includes the operation section 11 that enables the selection of print mode for printing on both surfaces of the medium P, wherein the print mode includes a high-speed mode and a low-speed mode.

Then, when the high-speed mode is selected through the operation section 11, the control section 90 causes the first in-device inversion section 42 to inverse the medium P.

Then, when the low-speed mode is selected through the operation section 11, the control section 90 causes the first in-machine inversion section 25 to inverse the medium P.

According to this, since the transport paths to be used can be distributed according to the user's request at that time, it is possible to extend the life of the transport paths.

The printing system 1 further includes the second inversion device 210 that is provided downstream of the second printing machine 200 in the transport direction T and that is configured to inverse the medium P.

According to this, it is possible to discharge the medium P to the downstream side with the upper surface of the most recent medium P facing down.

The printing system 1 further includes the second inversion device 210 that is provided downstream of the second printing machine 200 in the transport direction T and that has the second in-device inversion section 72 configured to inverse the medium P.

The printing system 1 further includes the operation section 11 that enables the selection of print mode for printing on both surfaces of the medium P, wherein the print mode includes a high-speed mode and a low-speed mode.

The second printing machine 200 includes the second in-machine inversion section 55 configured to inverse the medium P printed by the second printing section 54.

Then, when the high-speed mode is selected through the operation section 11, the control section 90 causes the first in-device inversion section 42 and the second in-device inversion section 72 to inverse the medium P.

When the low-speed mode is selected through the operation section 11, the control section 90 causes the first in-machine inversion section 25 and the second in-machine inversion section 55 to inverse the medium P.

According to this, since the transport paths to be used can be distributed according to the user's request at that time, it is possible to extend the life of the transport paths.

Although the printing system 1 according to the above embodiment of the present disclosure basically has the above described configuration, it is needless to say that the partial configuration may be changed or omitted within the scope not departing from the gist of the present disclosure. The above described embodiments and other embodiments described below can be implemented in combination with each other within a range that is not technically inconsistent. Other embodiments will be described below.

In the above described embodiment, the printing system 1 may not include the control sections 91, 92, 93, and 94. In this case, the control section 90 controls the entire printing system 1.

In the above described embodiment, the printing system 1 may include a detector capable of detecting a defective medium in the transport paths 317, 17, 18, 19, and 20. A defective medium includes a folded medium P, a medium P that is double-fed and has not been printed on, a medium P that has not been normally printed on due to ejection defects of the ejection section **24*h* and 54*h*, and the like. When the detector detects the defective medium, the control section 90 discharges the defective medium to either of the discharge sections 37 or 67. According to this, it is possible to prevent the defective medium from being stacked on the placement section 220** together with the medium P on which printing is normally performed.

In the above embodiment, for example, it is assumed that instruction for another printing process was received while a previous printing process is being performed by tandem printing using the first printing machine 100 and the second printing machine 200. In this case, the control section 90 changes the previous printing process presently being executed to a printing process by the second printing machine 200 alone, and performs the other printing process by the first printing machine 100. Then, the control section 90 discharges the medium P on which the other printing process was performed by the first printing machine 100 to the discharge section 37. Then, upon completion of the other printing process by the first printing machine 100, the previous printing process is continued by the tandem printing.

In the above described embodiment, the control section 90 may simultaneously perform single-sided printing in which printing is performed on one surface of the medium P by both the first printing machine 100 and the second printing machine 200.

In the above embodiment, the printing system 1 may store the set value S2 in the storage section of the control section 90. The set value S2 is a judgment value for estimating whether or not the degree of the curl of the medium P on which double-sided printing is performed and which is placed on the placement section 220 exceeds the tolerance range. For example, when the print duty of the print data is equal to or greater than the set value S2, the degree of the curl of the medium P placed on the placement section 220 may exceed the tolerance range.

Then, the control section 90 determines, based on the set value S2, whether or not to perform a printing process for taking a long time from when the print data PD2 is printed to when the medium P is placed on the placement section 220, among the printing processes for double-sided printing on the medium P. For example, it is assumed that the print duty of the print data PD2 is equal to or greater than the set value S2. In this case, the control section 90 performs the above described printing process of causing the first printing section 24 to print the print data PD2 having a high print duty and causing the second printing section 54 to print the print data PD1, among the print data PD1 and the print data PD2.

In this case, the control section 90 may lengthen the time that elapses from when the print data PD2 is printed to when the medium P is placed on the placement section 220, as compared with the case where the print duty of the print data PD2 is lower than the set value S2. For example, the control section 90 may lengthen the elapsed time by lengthening the time for which the medium P is held at the inversion path end section 44 of the first inversion device 110. For example, the control section 90 may lengthen the elapsed time by decreasing the transport speed of the medium P in any of the first transport path **17*b* and the transport paths 18, 19, and 20**.

On the other hand, when the print duty of the print data PD2 is lower than the set value S2, the control section 90 does not perform the printing process described above based on the print duty. That is, the control section 90 causes the first printing section 24 to print the print data PD1 to be printed on the surface that is the preceding page of the medium P, and causes the second printing section 54 to print the print data PD2 to be printed on the surface that is subsequent page of the medium P. According to this, when the print duty of the print data PD2 is lower than the set value S2, it is possible to suppress a decrease in throughput due to the inversion process of the medium P being performed by the second inversion device 210.

Note that the application amount of ink to be applied to the surface of the medium P on which the print data is printed changes in accordance with the print duty of the print data. Therefore, the above described set value S2 may not be a judgment value to be compared with the print duty of the print data, but may be a judgment value to be compared with the application amount of the ink to be applied to the surface of the medium P on which the print data is printed. Then, the control section 90 may determine the specification of the printing process in the above described double-sided printing based on the set value S2.

In the above embodiment, the printing system 1 may store a set value S3 in the storage section of the control section 90. The set value S3 is a judgment value for estimating whether or not the degree of the curl of the medium P on which the double-sided printing is to be performed and which is placed on the placement section 220 exceeds the tolerance range. For example, it is assumed that the print duty difference between the print duty of the print data PD1 and the print duty of the print data PD2 is equal to or larger than the set value S3. In this case, there is a possibility that the degree of the curl of the medium P placed on the placement section 220 may exceed the tolerance range.

Then, the control section 90 determines, based on the set value S3, whether or not to perform a printing process for taking a long time from when the print data PD2 is printed to when the medium P is placed on the placement section 220, among the printing processes for double-sided printing on the medium P. For example, it is assumed that the print duty difference between the print duty of the print data PD1 and the print duty of the print data PD2 is equal to or larger than the set value S3. In this case, the control section 90 performs the above described printing process of causing the first printing section 24 to print the print data PD2 having a high print duty and causing the second printing section 54 to print the print data PD1, among the print data PD1 and the print data PD2.

On the other hand, it is assumed that the print duty difference between the print duty of the print data PD1 and the print duty of the print data PD2 is smaller than the set value S3. In this case, the control section 90 does not perform the printing process based on the print duty described above. That is, the control section 90 causes the first printing section 24 to print the print data PD1 to be printed on the surface that is the preceding page of the medium P, and causes the second printing section 54 to print the print data PD2 to be printed on the surface that is subsequent page of the medium P. According to this, when the above described print duty difference is smaller than the set value S3, it is possible to suppress a decrease in throughput due to the inversion process of the medium P being performed by the second inversion device 210.

Note that the above described set value S3 may not be a judgment value to be compared with the print duty difference. In this case, the set value S3 may be a judgment value to be compared with an ink application amount difference between the amount of ink to be applied to the surface on which the print data PD1 is printed and the amount of ink to be applied to the surface of the medium P on which the print data PD2 is printed. Then, the control section 90 may determine the specification of the printing process in the above described double-sided printing based on the set value S3.

In the above embodiment, the printing system 1 may store a set value S4 in the storage section of the control section 90. The set value S4 is a judgment value for estimating whether or not a decrease in rigidity of the medium P to be double-sided printing exceeds a tolerance range. For example, when the sum of the print duty of the print data PD1 and the print duty of the print data PD2 is equal to or greater than the set value S4, there is a concern that the transport of the medium P in the second transport path **19*b* and the transport path 20 will not be performed normally. In this case, the control section 90 may set the transport speed of the medium P in the second transport path 19*b* and the transport path 20 to be lower than the normal transport speed. According to this, it is possible to suppress the transport failure of the medium P in the second transport path 19*b* and the transport path 20**.

Note that the above described set value S4 may not be the total sum of the print duties. In this case, the set value S4 may be a judgment value to be compared with the sum of the amount of ink to be applied to the surface of the medium P on which the print data PD1 is printed and the amount of ink to be applied to the surface of the medium P on which the print data PD2 is printed. Then, the control section 90 may determine the specification of the printing process in the above described double-sided printing based on the set value S4.

Whether or not to perform the printing process based on the print duty of the print data to be printed on the medium P described in the above embodiment may be determined based on the humidity of the environment in which the printing system 1 is used. For example, when the humidity around the printing system 1 is high, the water content of the medium P at the time of starting printing will be higher. In this case, compared to a case where the humidity around the printing system 1 is low, the degree of the curl when the print data is printed on the medium P will be small. Therefore, for example, when the humidity is equal to or higher than a set value S5, the control section 90 does not perform the printing process based on the print duty of the print data to be printed on the medium P. On the other hand, when the humidity is lower than the set value S5, the control section 90 performs the printing process based on the print duty of the print data to be printed on the medium P. Note that the set value S5 may be stored in the storage section of the control section 90.

In the above described embodiment, the printing system 1 may discharge a treatment liquid onto the medium P from the ejection section **24*h* included in the first printing section 24 of the first printing machine 100 and may discharge the ink onto the medium P from the ejection section 54*h* included in the second printing section 54 of the second printing machine 200. The treatment liquid discharged from the ejection section 24*h* includes a decurling treatment liquid, a coating treatment liquid, a pretreatment liquid applied to the printing surface of the medium P before the ink is ejected, and the like. Alternatively, in the printing system 1, the printing system 1 may discharge the ink onto the medium P from the ejection section 24*h* included in the first printing section 24 of the first printing machine 100 and may discharge the treatment liquid onto the medium P from the ejection section 54*h* included in the second printing section 54 of the second printing machine 200. The treatment liquid discharged from the ejection section 54*h*** includes the decurling treatment liquid, the coating treatment liquid for coating, a post-treatment liquid applied to the printing surface of the medium P after the ink is ejected, and the like.

What is claimed is:

1. A printing system comprising:

a first printing machine including a first printing section configured to print on a medium transported in a transport direction and a first in-machine inversion section configured to inverse the medium printed by the first printing section;

a first inversion device that is provided downstream of the first printing machine in the transport direction and that is configured to inverse the medium;

a second printing machine that is provided downstream of the first inversion device in the transport direction and that has a second printing section configured to print on the medium; and a control section, wherein the first inversion device includes a first in-device inversion section configured to inverse the medium and a bypass transport section configured to transport the medium from the first printing machine toward the second printing machine without via the first in-device inversion section and when printing is performed on both surfaces of the medium in a state where an abnormality has occurred in the first in-device inversion section, the control section causes the first printing section to perform printing on a first surface of the medium, causes the first in-machine inversion section to inverse the printed medium, causes the inversed medium to be transported toward the second printing machine via the bypass transport section, and causes the second printing section to perform printing on a second surface of the medium.

2. The printing system according to claim 1, wherein the first inversion device includes a housing and the housing includes a first cover configured to be displaced between a position that covers the first in-device inversion section and a position that enable access to the first in-device inversion section and a second cover configured to be displaced between a position that covers the bypass transport section and a position that enables access to the bypass transport section.

3. The printing system according to claim 1, wherein when printing is performed only on one surface of the medium in a state where an abnormality has occurred in the first in-device inversion section, the control section causes the second printing section to perform printing.

4. The printing system according to claim 1, wherein when printing is performed only on one surface of the medium in a state where an abnormality has occurred in the first in-device inversion section, the control section transports the medium printed by the first printing section toward the second printing machine via the bypass transport section.

5. The printing system according to claim 1, further comprising:

an operation section that enables the selection of print mode for printing on both surfaces of the recording medium, the print mode including a high-speed mode and a low-speed mode, wherein when the high-speed mode is selected via the operation section, the control section causes the first in-device inversion section to inverse the medium and when the low-speed mode is selected via the operation section, the control section causes the first in-machine inversion section to inverse the medium.

6. The printing system according to claim 1, further comprising:

a second inversion device that is provided downstream of the second printing machine in the transport direction and that is configured to inverse the medium.

7. The printing system according to claim 1, further comprising:

a second inversion device that is provided downstream of the second printing machine in the transport direction and that has a second in-device inversion section configured to inverse the medium and an operation section that enables the selection of print mode for printing on both surfaces of the recording medium, the print mode including a high-speed mode and a low-speed mode, wherein the second printing machine includes a second in-machine inversion section configured to inverse the medium printed by the second printing section, when the high-speed mode is selected via the operation section, the control section causes the first in-device inversion section and the second in-device inversion section to inverse the medium, and when the low-speed mode is selected by the operation section, the control section causes the first in-machine inversion section and the second in-machine inversion section to inverse the medium.

* * * * *